US012630081B2

(12) United States Patent
Maillaud et al.

(10) Patent No.: US 12,630,081 B2
(45) Date of Patent: May 19, 2026

(54) LIGHT-EMITTING GLAZING FOR A VEHICLE, AND VEHICLE COMPRISING SUCH LIGHT-EMITTING GLAZING

(71) Applicant: SAINT-GOBAIN GLASS FRANCE, Courbevoie (FR)

(72) Inventors: Laurent Maillaud, Aubervilliers (FR); Claire Davis, Courbevoie (FR)

(73) Assignee: SAINT-GOBAIN SEKURIT FRANCE

( * ) Notice: Subject to any disclaimer, the term of this patent is extended or adjusted under 35 U.S.C. 154(b) by 0 days.

(21) Appl. No.: 18/878,287

(22) PCT Filed: Jun. 27, 2023

(86) PCT No.: PCT/FR2023/050973
§ 371 (c)(1),
(2) Date: Dec. 23, 2024

(87) PCT Pub. No.: WO2024/003498
PCT Pub. Date: Jan. 4, 2024

(65) Prior Publication Data
US 2025/0376109 A1      Dec. 11, 2025

(30) Foreign Application Priority Data
Jun. 27, 2022      (FR) ...................................... 2206394

(51) Int. Cl.
*B60Q 3/208*          (2017.01)
*B32B 17/10*          (2006.01)
(Continued)

(52) U.S. Cl.
CPC ........ *B60Q 3/208* (2017.02); *B32B 17/10036* (2013.01); *B32B 17/10541* (2013.01);
(Continued)

(58) Field of Classification Search
CPC .............. B60Q 3/208; B32B 17/10036; B32B 17/10541; B32B 17/10761;
(Continued)

(56) References Cited

U.S. PATENT DOCUMENTS

| | | | |
|---|---|---|---|
| 2005/0117109 A1* | 6/2005 | Marra ................... | G02B 6/0071 349/159 |
| 2013/0258709 A1* | 10/2013 | Thompson ........... | G02B 6/0023 362/608 |

(Continued)

FOREIGN PATENT DOCUMENTS

| | | |
|---|---|---|
| EP | 3 858 611 A1 | 8/2021 |
| WO | WO 2005/054915 A1 | 6/2005 |

(Continued)

OTHER PUBLICATIONS

DE 102018128574A1—Glazing for a motor vehicle and method for producing a glazing, 10 pages. (Year: 2025).*

(Continued)

*Primary Examiner* — Tuyen K Vo
(74) *Attorney, Agent, or Firm* — CUSHMAN PARTNERS, LLC

(57) ABSTRACT
A light-emitting laminated glazing for a vehicle, includes, between two sheets of glass, an intermediate layer forming a light guide surrounded by layers which have a lower refractive index and at least one of which is adhesive and is made of a crosslinked polymer.

21 Claims, 11 Drawing Sheets

(51) Int. Cl.
  *B60J 1/00*     (2006.01)
  *F21V 8/00*     (2006.01)

(52) U.S. Cl.
  CPC .. *B32B 17/10761* (2013.01); *B32B 17/10788*
     (2013.01); *B60J 1/001* (2013.01); *G02B*
     *6/0036* (2013.01); *B32B 2605/00* (2013.01)

(58) Field of Classification Search
  CPC ........... B32B 17/10788; B32B 2605/00; B60J
            1/001; G02B 6/0036
  See application file for complete search history.

(56)       References Cited

U.S. PATENT DOCUMENTS

| | | | |
|---|---|---|---|
| 2016/0349442 A1* | 12/2016 | Berard | B32B 17/10018 |
| 2017/0361576 A1* | 12/2017 | Legrand | B32B 17/10788 |
| 2019/0337269 A1* | 11/2019 | Sartenaer | B32B 17/10018 |

FOREIGN PATENT DOCUMENTS

| | | | | |
|---|---|---|---|---|
| WO | WO-2007122426 A1 * | 11/2007 | | C03C 27/10 |
| WO | WO 2010/049638 A1 | 5/2010 | | |
| WO | WO 2013/167832 A1 | 11/2013 | | |
| WO | WO 2014/009630 A1 | 1/2014 | | |

OTHER PUBLICATIONS

FR 3034501A1—Luminous glazing for e.g. building, has diffusing particles including shell surrounding core with specific refractive index and having largest dimension of specific value, where particles are provided with largest dimension, 44 pages. (Year: 2025).*
International Search Report as issued in International Patent Application No. PCT/EP2023/050973, dated Sep. 26, 2023.

\* cited by examiner

Fig.13

LIGHT-EMITTING GLAZING FOR A VEHICLE, AND VEHICLE COMPRISING SUCH LIGHT-EMITTING GLAZING

CROSS-REFERENCE TO RELATED APPLICATIONS

This application is the U.S. National Stage of PCT/FR2023/050973, filed Jun. 27, 2023 which in turn claims priority to French patent application number 2206394 filed Jun. 27, 2022. The content of these applications are incorporated herein by reference in their entireties.

The present invention relates to a light-emitting glazing for a vehicle, particularly a road vehicle glazed unit with light-emitting diodes.

Light-emitting diodes (LEDs) have been used for a number of years to illuminate signaling devices (traffic lights, etc.), turn signals or position lights of motor vehicles. The advantages of diodes are their long service life, their luminous efficacy, their reliability, their low energy consumption and their compactness, making the equipment that uses them even more durable and requiring less maintenance.

More recently, light-emitting diodes have been used for motor vehicle roofs, particularly panoramic laminated roofs illuminated by light-emitting diodes. The light emitted by the diodes is introduced via the edge face into the interior glazing forming a guide, the light being extracted from the glazed unit by a scattering layer on the glazed unit.

Document WO2005054915 proposes, in its second example, a light-emitting car glazing comprising two sheets of glass and, between the second and third internal faces, a central polymer interlayer, made of polyvinyl butyral (PVB) or ethylene-vinyl acetate copolymer (EVA), between two layers with a lower refractive index than the central layer, in particular $MgF_2$ or Teflon. Scattering centers for light extraction are located on the central interlayer.

The present invention has sought to develop an alternative light-emitting vehicle glazing which is particularly robust and optically effective.

For this purpose, the subject of the present invention is a light-emitting glazing for a vehicle, in particular a road vehicle (car, truck, public transit: bus, coach bus, etc.) or a rail vehicle (train, metro, tramway), preferably bent, in particular a windshield, or else a rear window, or even a side window, preferably a roof, comprising a (curved) laminated glazing—transparent at least in a glass clear area—comprising:

- a first sheet (curved, bent, transparent), made from mineral or organic glass, optionally tempered, optionally tinted and even supertinted, in particular gray or green, with a first main face and a second main face—bare or coated with a functional (transparent) coating, in particular of at most 200 nm—(in particular the first face oriented toward the outside of the vehicle and even being the exterior face, often referred to as face F1, and the second face being face F2), or a first sheet intended to be the interior sheet, which first sheet for example has a refractive index (nv) of at least 1.5 in the visible range
- a second sheet (curved, bent, transparent), made from mineral or organic glass, preferably clear or extra-clear (colorless), with a third main face, bare or even coated with a functional (transparent) coating of at most 200 nm, and a fourth main face (bare or coated with a functional (transparent) coating of at most 200 nm), a second sheet, in particular intended to be the interior sheet (in particular third face oriented toward the interior, often referred to as face F3 of the vehicle, and fourth face oriented toward the passenger compartment, referred to as face F4), or a second sheet intended to be the exterior sheet, for example the second sheet having a refractive index (n'v) of at least 1.5 in the visible range,

- a (transparent) polymer lamination interlayer, in particular an adhesive multilayer (e.g. 2, 3, 4, 5 layers and even films), comprising an upper part (single or multilayer, e.g. 1 or 2 or 3 adhesive layers and in particular even adhesive films) and a lower part (single or multilayer, e.g. 1 or 2 or 3 adhesive layers and in particular adhesive films), in adhesive contact with the third face (bare or already coated),
- a first upper layer with a refractive index n1 in the visible range, preferably forming part of the lamination interlayer (of the upper part)
- a first lower layer with a refractive index n'1 in the visible range, preferably forming part of the lamination interlayer (of the lower part)
- between and in contact with the first lower and upper layers, an intermediate layer with a refractive index n0 in the visible range, where n0−n1 is at least 0.04 in the visible range or even at least 0.1 or at least 0.15 or 0.2 or 0.25, and n0−n'1 is at least 0.04 in the visible range or at least 0.1 or at least 0.15 or 0.2 or 0.25, the first upper layer being between the second face and the intermediate layer the first lower layer being between the intermediate layer and the third face at least one (preferably both) of the first lower or upper adhesive layers is made of crosslinked polymer material, forming part of the lamination interlayer
- a light source (in the visible range) optically coupled to the intermediate layer forming a light guide (preferably a single-layer and even film light guide), in particular a clear or even extra-clear intermediate layer
- light extraction means, light guided in the intermediate layer.

According to the invention, the intermediate layer has a thickness E0 of at most 2 mm (and even at most 1 mm) and at least 200 μm or even 400 μm. The intermediate layer is (preferably) a thermoplastic film (not glass-adhesive, e.g. polyester, polycarbonate) or glass film (in particular ultrathin glass (UTG)) or a thermoplastic adhesive film, forming part of the lamination interlayer (intermediate part).

The invention lies in the choice of at least one first adhesive layer of crosslinked polymer material to promote guidance. It is no longer necessary for the guide to be the thermoplastic interlayer sheet as in the prior art. Preferably, it is a glass film or a non-adhesive thermoplastic film, where n0 can be selected based on n1 and n'1, or vice versa.

The first upper layer can effectively optically isolate the intermediate layer from the first, in particular (super)tinted sheet, and/or from an optionally tinted part of the lamination interlayer and/or from any element (tinted or absorbing or which would be disturbed by light or disrupt light guidance).

The first lower layer can effectively optically isolate the intermediate layer from the second sheet and/or from any element that would be disturbed by light or disrupt light guidance.

To promote guidance:
- preferably the first upper layer (in particular adhesive, and even crosslinked polymer) is at least 500 nm thick, better still at least 800 nm thick; advantageously the first upper layer is even at least 1 μm thick (in particular if coating, in particular crosslinked polymer) or 30 μm thick (in particular if film, in particular crosslinked polymer), and is preferably submillimeter.

and/or preferably the first lower layer (in particular adhesive, and even crosslinked polymer) is at least 500 nm thick, better still at least 800 nm thick; advantageously the first lower layer is even at least 1 µm thick (in particular if coating, in particular crosslinked polymer) or 30 µm thick (in particular if film, in particular crosslinked polymer), and is preferably submillimeter.

The thickness of the first upper and/or lower layer can be adapted (increased) for mechanical contribution.

The first upper and/or lower layer is an optical adhesive (OCA for optically clear adhesive, LOCA if liquid process then forming a coating) of ad hoc index n1 or n'1. The advantage of optical glue is its transparency, low haze and the ability to choose the thickness and refractive index n1 or n'1 to be as low as possible.

In particular for the first upper layer, n1 is lower than the refractive index of the adjacent layer (transparent, tinted or clear, colorless) in contact with it opposite the intermediate layer, adjacent layer selected from: crosslinked polymer (upper) adhesive layer (thermoplastic adhesive film (PVB, etc), thermoplastic film, or the first glass sheet, preferably mineral (often with a refractive index of around 1.51 to 1.53) or organic (polycarbonate (PC) or poly(methyl methacrylate) (PMMA)).

Preferably, at least one of the first and second glass sheets for the exterior glazing is made of mineral glass, in particular the first sheet (in particular tinted) for a roof or the second sheet (in particular clear) for a rear window, the first or second sheet for a windshield or a side window (front or rear, including the rear quarter panel).

The thickness of layer(s) between second face and third face is preferably at most 1.1 mm or 0.9 mm and in particular the thickness of the lamination interlayer (of one or several adhesive thermoplastic and/or crosslinked polymer layers) is at most 1.1 mm or 0.9 mm, preferably the glass and/or any other layer is colorless on the side of the extracted light observer (inside the passenger compartment, or outside the vehicle).

The thickness between first face and fourth face is preferably at most 9 mm or 7 mm, in particular for a road vehicle.

The intermediate layer does not significantly absorb light from the source. In particular, the intermediate layer is preferably clear, extra-clear.

Preferably, the second glass sheet and/or any lower layer between the light extraction means and the extracted light observer is clear, colorless (inside the passenger compartment, or outside the vehicle) rather than tinted (or even supertinted). It is preferable to avoid any layer that significantly absorbs the extracted light (monochromatic or polychromatic).

Conversely, the first sheet and/or one or more upper layers can be tinted (in particular supertinted).

For simplicity's sake, the first upper and lower layers are made of the same material (and even the same color) and/or have the same thickness. One and/or other of the upper and lower layers may be aligned with or project beyond the edges of the intermediate layer (over all or part of the perimeter).

In the present invention, the expression "crosslinked polymer" relates to the family of thermosetting (in other words, thermoset) polymers in the broad sense (any type of crosslinking).

In particular for the first lower layer, n'1 is lower than the refractive index of a lower layer (transparent, preferably clear, colorless to (super)tinted) in contact with it opposite the intermediate layer chosen from: crosslinked polymer (lower) adhesive layer, thermoplastic adhesive film (PVB or EVA or thermoplastic polyurethane (known as TPU), especially if the second sheet is made of organic glass such as PC or PMMA), thermoplastic film or the second sheet of mineral glass (with a refractive index of about 1.51 to 1.53) or organic glass (PC or PMMA).

Typically, PVB has a refractive index of 1.48, PC has a refractive index of about 1.56 to 1.59, or PMMA has a refractive index of about 1.47 to 1.49.

The light source (peripheral, preferably offset from the clear glass area) can be removed, added, sold separately or as a kit. Naturally, the intermediate layer is an operational light guide once their light source is mounted.

The intermediate layer has a thickness E0 sufficient to promote light injection and guidance, and is limited to avoid excess thickness, which complicates assembly. A self-supporting film is preferred to a liquid coating on a support.

The intermediate layer is preferably single-layer, and is even a film for simplicity's sake.

If necessary, the intermediate layer is multilayered, with guiding layers all with refractive index(es) greater than n1 and n'1. The upper guiding layer in contact with the first upper layer has a refractive index n0a, with n0a−n1 being at least 0.04 in the visible range, and n0a−n'1 being at least 0.04 in the visible range.

The lower guiding layer in contact with the first lower layer has a refractive index n0b, with n0b−n1 being at least 0.04 in the visible range, and n0b−n'1 being at least 0.04 in the visible range.

Preferably, the refractive index difference between the guiding layers forming the multilayer intermediate layer is less than 0.1, and even less than 0.04. For example, a middle guiding layer between the upper and lower guiding layers has a refractive index n0c greater than n0a and/or n0b. For example, the middle layer is a thermoplastic film (PET, etc) or glass (PSA, etc) and the upper and lower guiding layers are a coating on said film.

The thickness E0 corresponds to the total multilayer thickness. The film can be thicker than a coating. Alternatively, it is possible to have one adhesive film (one of the upper or lower layers) with two adhesive guiding coatings (middle and other of the upper or lower guiding layers).

One or more alternative guiding layers, in particular thermoplastic adhesive, can be inserted into the intermediate layer forming a multilayer guide, all with refractive index (es) greater than n1 and n'1.

The thickness of the alternative guiding layer(s) is less than E0, in particular even less than E0/2.

Preferably, the refractive index difference between the guiding layers forming the multilayer intermediate layer is less than 0.1, and even less than 0.04 or even zero.

Preferably, the refractive index of any layer according to the invention is defined for a reference value in a range extending from 550 to 600 nm.

Preferably, any crosslinked polymer adhesive film according to the invention is at least 30 µm and preferably submillimeter.

Preferably, any thermoplastic adhesive layer according to the invention is a film.

Preferably, any thermoplastic adhesive film according to the invention is no thicker than 1 mm and even no thicker than 0.5 mm.

Preferably, any ultra-thin glass (UTG) film according to the invention has a thickness of at most 0.6 mm, and in particular at least 0.1 µm.

Preferably, any non-adhesive thermoplastic film according to the invention has a thickness of at most 1 mm and even at most 0.5 mm or at most 0.3 mm.

Preferably, any film according to the invention is flexible and therefore curved according to the curvature of the glazing.

Preferably, a so-called non-adhesive layer according to the invention is non-adhesive to the mineral glass, therefore does not form part of the lamination interlayer (bonding the first and second glass sheets, at least one of which is mineral), has a peel strength of less than 1 N/cm and even 2 N/cm and even zero.

An upper layer (first upper layer or preferably additional upper layer) can be a PVB film (clear, tinted) with UV and/or acoustic protection and/or even wedges (for a windshield with a head-up display function in particular).

A lower layer (first lower layer or preferably additional lower layer) can be a PVB film (clear) with UV and/or acoustic protection and/or even wedges (for a windshield with a head-up display function in particular).

The intermediate layer can be a PVB film (clear) with UV and/or acoustic protection and/or even wedges (for a windshield with a head-up display function in particular).

Preferably, any PVB-based adhesive layer (intermediate, lower and/or upper, sheet, additional lower and/or upper layer) comprises 70% to 75% PVB, 20% or 25 to 30% plasticizer and less than 1% additives. There are also PVB sheets with few or no plasticizers (less than 10% or 5% or even 1% in particular), such as the "MOWITAL LP BF" film from KURARAY.

In the present text, "hue" means the colored appearance in transmission, characterized in particular by L*a*b* colorimetric coordinates, calculated from the transmission spectrum between 380 and 780 nm by taking into consideration the illuminant D65 and also the CIE 1964 observer (10°).

Any thermoplastic (functional) film according to the invention (intermediate layer, optical film: extractor, redirector, barrier film) in particular non-adhesive to glass, is for example: polyester, in particular polyethylene terephthalate (PET), polybutylene terephthalate PBT, poly(ethylene naphthalate) (PEN), polyimide (PI), polyetherimide (PEI), polyurethane (PU) or cellulose triacetate (TAC), acrylic, polyolefin, in particular polypropylene (PP), polycarbonate (PC) or polymethyl methacrylate (PMMA), (coextruded) film made of PET-PMMA, poly(vinyl chloride) PVC, polyether ether ketone (PEEK).

With a thermoplastic film (intermediate layer, optical film: extractor, redirector, barrier film) made of PC or PMMA, thermoplastic polyurethane (TPU) or EVA is preferred (for more chemical compatibility) as an optional lower or upper thermoplastic adhesive layer. It is possible to choose thermoplastic or thermoset EVA.

Regarding the optical properties, the intermediate layer may have a light transmission of at least 85% or 90% and/or a haze of less than 6%, less than 5%, less than 4%, less than 3%, less than 2%, less than 1%, less than 0.5%.

Any crosslinked polymer adhesive layer (lower and/or upper adhesive layer, in particular lower and/or upper first layer) or stack of layers between second and third faces can have a light transmission of at least 85% or 90% (or lower if tinted) and/or a haze of less than 6%, less than 5%, less than 4%, less than 3%, less than 2%, less than 1%, less than 0.5%.

The glazing may have a transparency suitable for its use and/or a haze of less than 6%, less than 5%, less than 4%, less than 3%, less than 2%, less than 1%, less than 0.5%.

A film is a self-supporting layer, while a coating is obtained by deposition (liquid deposition, especially for polymer layers, and/or physical or chemical vapor deposition).

According to the invention, an upper layer is a layer between the second face (bare or with functional coating) and the intermediate layer. This may be the first upper layer or one or more overlying layers known as additional upper layers.

According to the invention, a lower layer is a layer between the intermediate layer and the third face (bare or with functional coating). This may be the first lower layer or one or more underlying layers known as additional lower layers.

The lamination interlayer may have a thickness (in microns) of at least 250, 300, 350, 400, 450, 500, 550, 600, 650, 700, 750, 800, 850, 900, 950, 1000 and at most 1100.

For example, index n0 is greater than or equal to 1.41, 1.42, 1.43, 1.44, 1.45, 1.46, 1.47, 1.48, 1.49, 1.5, 1.51, 1.52, 1.53, 1.54, 1.55, 1.56, 1.57, 1.59, 1.6, 1.61, 1.61, 1.62, 1.63, 1.64, 1.65.

In particular, with an n0 of at least 1.55 in the visible range, the refractive index n1 (and/or n'1) in the visible range in particular at 550 nm and preferably from 500 nm to 750 nm and even from 380 nm to 750 nm may also be less than or equal to 1.51, 1.50, 1.49, 1.48, 1.47, 1.46, 1.45, 1.44, 1.43, 1.42, 1.41, 1.40, 1.39, 1.38, 1.37, 1.36, 1.35, 1.34, 1.33, 1.32, 1.31, 1.30, 1.29, 1.28, 1.27, 1.26, 1.25.

The first glass sheet (preferably mineral) can have a refractive index nv of at most 1.55 and even 1.53, particularly from 1.51 to 1.53; in this case, it is preferable to have the first upper layer (particularly adhesive) with a refractive index n1 lower than nv.

The second glass sheet (in particular mineral glass) can have a refractive index n'1 of less than 1.55 and even of at most 1.53 (in particular from 1.51 to 1.53 for mineral glass), and it is therefore preferable to have the first lower layer (in particular adhesive) with a refractive index n1 of less than n'1.

It is preferable and even generally essential for the glazing to comprise at least one transparent zone, called "clear glass area" or clear view, not covered by a peripheral (internal) opaque masking layer. The clear glass area is thus a central area.

This clear glass area can generally represent at least 20%, preferably at least 50% and in particular at least 70% or 80% or 90% or 95% of the total surface area of the glazing, including the zones covered by an encapsulation or seals. In other words, the opaque layer covers a zone that generally represents at most 80%, preferably at most 50% and in particular at most 30% or 20% or 10% or 5% of the total surface area of the glazing.

The optical density of the (internal) opaque layer is preferably at least 2 and even up to 5.

The intermediate layer can occupy at least 70%, 80%, 90%, 95% of the surface area of the glazing.

The first upper layer (preferably adhesive and even crosslinked polymer) and/or the lower first layer (preferably adhesive and even crosslinked polymer) can occupy at least 70%, 80%, 90%, 95% of the glazing surface.

The first upper adhesive layer (preferably adhesive and even crosslinked polymer) and the first lower adhesive layer (preferably adhesive and even crosslinked polymer) can occupy at least 90% or 95% and better still 100% of the surface of the intermediate layer.

In a preferred embodiment, n1 is at most 1.48 (n1 is at most or less than the refractive index of the PVB) and even at most 1.45 or 1.4. The first, preferably adhesive upper layer (in particular crosslinked polymer material) is a film or coating. And n'1 is at most 1.48 (n'1 is at most or less than the refractive index of the PVB) and even at most 1.45 or 1.4. The first, preferably adhesive lower layer (in particular crosslinked polymer material) is a film or coating.

Preferably, the absolute difference between n'1 and n1 is at most 0.04 and even at most 0.02, and n'1 may even be equal to n1.

When the intermediate layer is an adhesive thermoplastic film (PVB, TPU, EVA, etc.), the other of the first lower or upper layers can be non-adhesive, for example a layer of silica, notably porous or MgF2.

Advantageously, the other of the first lower or upper layers is adhesive, preferably made of crosslinked polymer or thermoplastic (PVB, EVA, TPU, etc.), forming part of the lamination interlayer.

Once again, if two adhesive OCA upper and lower layers are chosen, more choice is available over the refractive index n1 or n'1, and the addition of interlayers is not compulsory to laminate the glass panes. The choice of intermediate layer can be extended.

A three-film solution is preferable: OCA film/guide film/OCA film. For simplicity, the upper and lower layers can be made of the same material and have the same thickness. The upper film can be tinted with a coloring agent.

In one embodiment, the first upper and lower layers are crosslinked polymer adhesive layers, with n1 and/or n'1 of at most 1.46 or 1.4 or 1.35 or 1.3, with the absolute difference between n'1 and n1 being at most 0.04 and even at most 0.02 or zero. The intermediate layer (preferably single-layer) is preferably a thermoplastic film (polyester, in particular PET or polycarbonate) or glass, with n0 of at least 1.5 and even at least 1.52 or 1.54.

The crosslinked polymer material of the first lower and/or upper layer (or even any other additional lower and/or upper adhesive layer) may preferably be chosen from a polymer based on (or substantially consisting of) polyacrylate (for example to have a refractive index n1 or n'1 of at most 1.46 or 1.4), in particular fluoro urethane acrylate (to have a lowest possible refractive index n1 or n'1) or urethane acrylate or fluorosilicone acrylate, polysiloxanes or silicone (for example with refractive index n1 or n'1 of at most 1.4 or 1.3), in particular polydimethylsiloxane, polyurethane, polyvinyl acetate, polyester or even epoxy polymer, poly-epoxides In particular, the crosslinked polymer material of the first upper and/or lower adhesive layer is chosen from an acrylate-based polymer, in particular urethane acrylate or silicone acrylate or silicone-based, and the polymer further having a fluorinated function A crosslinked polymer adhesive layer according to the invention (any lower and/or upper adhesive layer) can contain at least 50%, 60%, 70%, 80%, 90%, 95% by weight of polymer(s) and even at most 20%, 10%, 5%, 2%, 1% of additives A crosslinked polymer adhesive layer according to the invention (any lower and/or upper adhesive layer) may contain a main polymer (or base polymer) at least 50%, 60%, 70%, 80%, 90%, 95% by weight of polymer(s).

A crosslinked polymer adhesive layer according to the invention (any lower and/or upper adhesive layer) may comprise other additives (preferably less than 10% or 5% or 1% by weight of layer) such as at least one of the following:
  crosslinking agent for example photoinitiators (residual),
  plasticizers (for greater flexibility)
  adhesion promoters additives for durability.

The degree of polymerization or even crosslinking of a crosslinked polymer adhesive layer according to the invention is not necessarily 100%; the material can therefore comprise residual prepolymers, monomers, oligomers. NMR (Nuclear Magnetic Resonance) can be used to analyze the layer e after crosslinking in order to determine the degree of polymerization. It is possible to have a mixture of polymers.

It is preferred that the crosslinked polymer adhesive layer(s) (film and/or coating (any lower and/or upper adhesive layer)) according to the invention may have a thickness (in microns) of at least 250, 300, 350, 400, 450, 500, 550, 600, 650, 700, 750, 800, 850, 900, 950, 1000, and at most 1100.

It is preferred to have a total thickness of thermoplastic adhesive layer(s) according to the invention may have a thickness (in microns) of at most 800, 750, 700, 650, 600, 550, 500, 450, 400, 350.

The intermediate layer preferably in film form or in coating form may have a thickness (in microns) of at least 200, 250, 300, 350, 400, 450, 500, 550, 600, 650, 700, 750, 800, 850, 900, 950, 1000 and at most 1100.

The first upper (and/or lower) layer, in particular adhesive and crosslinked polymer, in coating form on the first curved glass sheet (on the second curved glass sheet) may have a thickness (in microns) of at least 1, 2, 3, 4, 5, 6, 7, 8, 9, 10, 15, 20, 25, 30, 35, 40, 45, 50, 55, 60, 65, 70, 75, 80, 85, 90, 95, 100, 150, 200, 250, 300, 350, 400, 450, 500, 550, 600, 650, 700, 750, 800, 850, 900, 950, 1000 μm and at most 1100 μm.

A crosslinked polymer layer according to the invention (film or coating, in particular a first upper or lower adhesive layer) can be polyacrylate, which designates any polymer containing repeating units derived from acrylate. The repeating unit can be substituted or not substituted in the allowed valence range. The acrylate polymer may be homopolymer and/or copolymer. The polyacrylate may comprise one or more polymethyl acrylates, polyethylene acrylate, polypropyl methacrylate, polymethyl methacrylate, polyethylene methacrylate, polyethyl methacrylate, polypropyl methacrylate.

A crosslinked polymer layer according to the invention (film or coating, in particular a first upper or lower adhesive layer) can be an epoxy polymer, e.g. the polymer obtained after polymerization of substances containing epoxy bonds. The epoxy polymer may comprise one or more epoxy bisphenol A, bisphenol A epoxy, halogenated phenolic epoxy, phenolic epoxy, cycloaliphatic epoxy, bisphenol S epoxy resin.

Advantageously, the first lower and/or upper layer is a self-supporting crosslinked polymer film—which is in adhesive contact with the third face (or with a first lower layer, notably a thermoplastic adhesive or crosslinked polymer material)—in particular chosen from:
  pressure-sensitive film, preferably chosen from polymers preferably with acrylate, in particular based on polyacrylate or silicone acrylate or urethane acrylate, the polymer further preferably having a fluorinated function
  or a so-called post-adhesive polymer film partially (photo) crosslinked before assembly and preferably fully (photo)crosslinked after assembly, and preferably a photo-crosslinked post-adhesive film and preferably with acrylate, in particular based on polyacrylate or silicone acrylate or urethane acrylate, the polymer further preferably having a fluorinated function.

This film (PSA or post-adhesive) can be locally textured for light extraction (extractor film).

Similarly, any crosslinked polymer adhesive layer according to the invention can be a PSA or post-adhesive film, preferably with a secondary acrylate or polyacrylate function.

Adhesive contacting results from the continued photocrosslinking. Before carrying out the crosslinking, the assembled glazing is placed under vacuum for degassing, then placed in a pressurized autoclave with a positive pressure of 2-4 bar, for example, and optionally, at a temperature greater than ambient temperature.

In particular, the pressure sensitive adhesive (PSA) bonds by contact after application of a mechanical pressure.

The first lower and/or upper layer may be a crosslinked polymer adhesive coating on the intermediate layer, in particular a thermoplastic or glass film intermediate layer, or on a support, in particular a thermoplastic or glass (non-adhesive) film. Said support preferably has another crosslinked polymer adhesive layer on a main face opposite and/or in adhesive contact with a thermoplastic or crosslinked polymer adhesive layer of the lamination interlayer.

This support for the first upper layer is tinted, for example.

This support for the first lower layer is preferably clear (colorless) for more visible extracted light on the fourth face (F1 or F4 depending on use configurations).

The crosslinked polymer material of a crosslinked polymer adhesive layer according to the invention (lower or upper adhesive layer, in particular first lower or upper adhesive layer, additional layer, framing layer, etc.) is based on crosslinked polymer (one or more crosslinked polymers), in particular substantially consisting of crosslinked polymer. Preference is given to a crosslinked polymer material without a Carcinogenic, Mutagenic and Reprotoxic (CMR) agent.

Any lower or upper adhesive layer, in particular the first lower and/or upper layer, can have good adhesion to glass (mineral or even organic). The intermediate layer or any other lower or upper adhesive layer, for example, reaches a peel strength for the mineral glass (or the organic glass) greater than 2 N/cm, 3 N/cm, 4 N/cm, 5 N/cm, 6 N/cm, 7 N/cm, 8 N/cm, 9 N/cm, 10 N/cm.

The crosslinked polymer adhesive layer according the invention (deposition by liquid route on first and/or second sheet or on support) may be crosslinked entirely or partially before, during or after the lamination method between the first and second sheets (in particular sheets of mineral glass).

The intermediate layer (in film) may be crosslinked entirely or partially before during or after the lamination method between the first and second glass sheets.

The lamination in the absence of thermoplastic material is carried out by at least one vacuum under pressure.

For the manufacture of a crosslinked polymer adhesive layer according to the invention (the lower or upper adhesive layer, in particular the first lower and/or upper layer; or additional layer, framing layer), crosslinkable adhesives which cure when their components react (in particular under ultraviolet, thermo-crosslinkable, etc.) or when a solvent evaporates may be used. In all cases, there is a chemical reaction in order to create chemical bonds for the crosslinking, in which case the crosslinked polymer is defined by the formation of a 3D network of polymer chains bound by chemical bonds.

Thus, the way in which the crosslinkable adhesive cures depends on its nature, with some (photo) crosslinking particularly by energy supply of the ultraviolet (UVA) or visible range (400-405 nm) type, and others crosslinking at ambient temperature with the addition of a curing agent by chemical reaction. Other crosslinkable adhesives are crosslinked by chemical reaction initiated and favored owing to the supply of thermal energy.

Liquid deposition of the crosslinkable adhesive (lower and/or upper adhesive layer, in particular first lower and/or upper adhesive layer; additional layer, framing layer) can be done by spray coating, curtain coating, flow coating, roller coating, slot die, dip coating or casting, blade coating, screen printing, inkjet, drop casting, or by filling a cavity.

Preferably, the crosslinked polymer adhesive layer according to the invention (lower or upper adhesive layer; in particular first lower or upper layer, additional layer, framing layer, etc.) can preferably be ultraviolet photocrosslinked, for example comprises an ultraviolet photocrosslinked polymer matrix.

The crosslinked polymer material according to the invention (lower and/or upper adhesive layer, in particular first lower and/or upper layer, additional layer, etc.) can preferably be based on (or substantially consist of) a polymer associated with one or more other functions, such as:

acrylate function (primary or secondary) for photo-crosslinking (crosslinked polymer material based on urethane acrylate or silicone acrylate)

and/or the main fluorinated (chemical) function to lower the refractive index (crosslinked polymer material based on fluoro-urethane acrylate or fluorosilicone acrylate) or the main fluorene (chemical) function to increase the refractive index.

Depending on the desired properties, the acrylate function can be used for photo-crosslinking (for a urethane acrylate or a silicone acrylate). The acrylate function allows the photo-crosslinking of the polymer, the backbone of the polymer may consist of other functions such as urethane or fluorine. In particular, any crosslinked polymer adhesive layer according to the invention is acrylate-functional or is a polyacrylate.

In a first example of a lower or upper adhesive layer (first lower layer or additional adhesive layer) in the form of a coating, a crosslinkable UV resin is applied to the second or first sheet (of mineral or organic glass), respectively. One or multiple layers can be deposited on a polymer or ultra-thin glass support.

UV-curable resins may include acrylate-based, urethane acrylate-based, silicone-based and fluoro urethane acrylate-based resins.

Low refractive index crosslinkable liquid adhesives (preferably for the first lower and/or upper layer) include the following resins:

based on urethane acrylate, for example from Norland, in particular the product called LOCA Norland NOA 1315 (refractive index 1.315), which is an aliphatic urethane acrylate, based on fluoro urethane acrylate, for example from Shin-A, in particular the product called SFA 335 (refractive index 1.335-1.339) or SFA 387 (refractive index 1.385-1.389), based on acrylate, for example, in particular the product called UZ181A (refractive index 1.47) from AKChemTeck, or else the product called UVEKOL S15 (refractive index 1.44) from Allnex.

Mention may be made of LOCAs based on fluoro urethane acrylate, for example from Shin-A, in particular the product called LOCA Shin-A 335 (refractive index 1.335-1.339) or 387 (refractive index 1.385-1.389).

A pressure-sensitive adhesive, abbreviated to PSA and commonly called self-adhesive, is an adhesive which forms a mechanical bond when a pressure is applied to it, so as to render the adhesive integral with the surface to be adhesively bonded. No solvent or water or heat is necessary to activate the adhesive.

As its name shows it to be "pressure-sensitive," the degree of bonding between a given surface and the self-adhesive binder is influenced by the amount of pressure used to apply the adhesive to the target surface and the nature and density of the physical bonds formed between the adhesive and the substrate (mineral or organic glass sheet).

PSAs are generally designed to form a bond and to maintain the latter at ambient temperature.

PSAs may be made of rubber, polyurethane, acrylic ester polymer, polysiloxane.

PSAs are generally based on elastomer coupled with an appropriate additional adhesive agent or "tackifying" agent (for example an ester resin).

The elastomers can preferably be based:

on acrylates, which may be sufficiently tacky not to require an additional tackifying agent.

on silicone, requiring special tackifying agents such as "MQ"-type silicate resins, composed of monofunctional ("M") trimethylsilane which has reacted with quadrifunctional ("Q") silicon tetrachloride, silicone-based PSAs are for example gums and resins of polydimethylsiloxane dispersed in xylene or a mixture of xylene and toluene or optionally:

on block copolymers based on styrene, such as styrene-butadiene-styrene (SBS), styrene-ethylene/butylene-styrene (SEBS), styrene-ethylene/propylene (SEP) or styrene-isoprene-styrene (SIS) block copolymers, on vinyl ethers.

on nitriles.

PSA adhesives are sold in the form of double-sided adhesive rolls with a liner on each face to protect the PSA film.

Mention may be made, as silicone-based PSAs (for the first lower or upper layer), of Dow Corning® adhesives, such as 2013 Adhesive, 7657 Adhesive, Q2-7735 Adhesive, Q2-7406 Adhesive, Q2-7566 Adhesive, 7355 Adhesive, 7358 Adhesive, 280A Adhesive, 282 Adhesive, 7651 Adhesive, 7652 Adhesive, 7356 Adhesive or Taica adhesives such as OPT alpha GEL® such as K120E, K90E or MRK adhesives such as MR3050, MR3080.

Mention may be made, as acrylate-based PSAs, of Nitto adhesives such as CS98210U, CS98210UK or Tesa® adhesives such as OCA 69206, OCA 69208, OCA 69405.

As an acrylate-based PSA film, mention may be made of the product CS986 (refractive index 1.47) from Nitto.

As silicone-based PSA film (for the first lower and/or upper layer, preferably), mention may be made of the product called Opt Alpha Gel from Taica (refractive index 1.41).

Regarding the silicone, polydimethylsiloxane (PDMS) or dimethicone, which is an organometallic polymer of the family of siloxanes, is preferred.

In one example of a crosslinked polymer adhesive layer (first lower or upper layer, any other additional upper or lower adhesive layer, framing layer, etc.) in the form of an acrylate-based PSA film, mention may be made of the product called CS986 from Nitto with refractive index of 1.49.

In an example of a crosslinked polymer adhesive layer (first lower or upper layer, or any other additional upper or lower adhesive layer, framing layer, etc.) in the form of a coating, a mercapto-based UV crosslinkable resin ester is deposited, the product called NOA 65 from Norland with refractive index equal to 1.524.

In an example of a high-index crosslinked polymer adhesive layer (first lower or upper layer, additional upper or lower adhesive layer, framing layer, etc.) in the form of a coating, a monocomponent UV crosslinkable resin ester based on polyfluorine with an acrylate function is deposited, the product called ShinA SBPF-022 with refractive index equal to 1.60.

Between the second face and the first upper layer (preferably adhesive, crosslinked polymer or thermoplastic adhesive film), the glazing according to the invention can comprise an additional upper layer which is a thermoplastic adhesive film, notably tinted and in contact with the second face which is bare or coated with a functional coating, preferably electrically conductive, in particular heating or athermal.

And/or between the third face and the first lower layer (preferably adhesive, crosslinked polymer or thermoplastic adhesive film), the glazing according to the invention comprises an additional lower layer which is a thermoplastic adhesive film in contact with the third face, preferably bare or coated with a functional coating.

Between the second and third faces, the glazing can be stacked as required (layers in parentheses are optional):

(first PVB or EVA sheet)/first crosslinked polymer adhesive upper layer/intermediate layer which is a thermoplastic film (non-adhesive, in particular PET or PC) or glass film/first crosslinked polymer adhesive lower layer/(second PVB or EVA or TPU sheet), in particular first and second sheets based on the same polymer and even of the same thickness (first PVB or EVA sheet)/first crosslinked polymer adhesive upper layer/intermediate layer which is a thermoplastic film (non-adhesive, in particular PET or PC) or glass film/first adhesive lower layer/(second PVB or EVA or TPU sheet)

(first PVB or EVA sheet)/first crosslinked polymer adhesive upper layer/intermediate layer which is a thermoplastic film, in particular PET or PC or glass/first lower layer/(PVB or EVA or TPU), in particular PVB)

first upper adhesive crosslinked polymer layer/intermediate layer which is a glass film/first lower silica layer, in particular porous/(second PVB or EVA or TPU sheet), (first PVB or EVA sheet)/first adhesive upper layer/intermediate layer which is a thermoplastic film, in particular PET or PC or glass/first crosslinked polymer adhesive lower layer/(second PVB or EVA or TPU sheet), (first PVB or EVA film)/first upper layer/intermediate layer which is a thermoplastic film, in particular PET or PC or glass/first crosslinked polymer adhesive lower layer/(PVB or EVA or TPU), in particular a first silica upper layer, in particular porous/intermediate layer which is a glass film/first crosslinked polymer adhesive lower layer/(second PVB or EVA or TPU sheet), and preferably the first upper and/or lower layer is an adhesive film, in particular PSA.

The particularly (nano)porous silica can be a sol-gel layer and in particular with n1 and/or n'1 of at most 1.4 or 1.3, and even with a thickness of at least 800 nm.

The layers of the stack above the intermediate layer can be tinted and/or the first glass sheet (preferably mineral). In particular, the first glass sheet is the exterior glazing. The second face is then face F2.

As already mentioned, the second face (e.g. of a clear or extra-clear glass) may be in direct contact with the stack or may be coated with a functional coating, in particular an electrically conductive (non-adhesive) functional coating. The third face may be in direct contact with the stack or may be coated with a functional coating, in particular an electrically conductive (non-adhesive) functional coating.

The sequence can be strict, or one or more other layers can be inserted.

In particular for the above stacks, between the intermediate layer and the third face, the glazing can be free of thermoplastic adhesive layer and/or between the second face and the intermediate layer and the glazing can be free of thermoplastic adhesive layer.

In one configuration, the first upper layer can be adhesive made from crosslinked polymer material and the first lower (non-adhesive) layer is a thermoplastic polymer film of submillimeter thickness or a coating, in particular made from porous silica, the first lower layer is in contact with the intermediate layer which is said thermoplastic adhesive film (PVB, etc.) and with an additional lower adhesive layer, crosslinked polymer or thermoplastic, on the third face or the first lower layer is adhesive made from crosslinked polymer material and the first upper layer is a thermoplastic polymer film of submillimeter thickness or a coating, in particular made from porous silica, the first upper layer is in contact with the intermediate layer which is said thermoplastic adhesive film (PVB, etc.) and with an additional upper adhesive layer, crosslinked polymer or thermoplastic, on the second face.

In the latter configuration, the first upper layer can be a thermoplastic (in particular non-adhesive) film, optionally fluoropolymeric, at least 30 μm thick and submillimeter, bonded to the second face by at least one additional upper adhesive (bonding) layer of crosslinked polymer or thermoplastic material (e.g. PVB) or two additional upper adhesive (bonding) layers, a first additional (bonding) layer of crosslinked polymer material and a second additional (bonding) layer of thermoplastic polymer material (e.g. PVB) bonded to the second face.

Preferably, the thermoplastic film is chosen from:
locally scattering film, especially textured on the intermediate layer side
functional film: athermal or heating, comprising an electrically conductive coating, low-emissivity, heating, electrically conductive coating on the second face side
fluoropolymer film, with n1 not more than 1.5 or not more than 1.45, 1.4 or 1.3
tinted film (in the bulk, etc.).

As low-index film (in particular with an index of at most 1.45 in the visible range, a (thermoplastic) fluoropolymer film may therefore be chosen. The fluoropolymer film may be based on or even made from one of the following materials:
perfluoroalkoxy PFA, in particular with a refractive index of about 1.3
polyvinylidene fluoride PVDF, in particular with a refractive index of about 1.4
ethylene chlorotrifluoroethylene ECTFE
ethylene tetrafluoroethylene ETFE, more specifically poly (ethylene-co-tetrafluoroethylene, in particular with a refractive index of about 1.4
ethylene perfluorinated propylene copolymer FEP or (Fluorinated Ethylene Propylene), in particular with a refractive index of about 1.3
polytetrafluoroethylene PTFE, in particular with n2 of about 1.3, but which is the most difficult to laminate
polyvinyl fluoride (PVF).

It is preferable for it to have a haze of at most 2%. A fluoropolymer film is readily available from 30 or 50 μm. For better assembly, the fluoropolymer film may have one or two main surfaces treated by adhesion-promoting surface treatment, preferably corona treatment.

In one configuration, the first sheet (preferably mineral glass) is tinted and/or the first upper layer, in particular the upper crosslinked polymer adhesive layer, is tinted and/or an additional upper adhesive layer, preferably made of thermoplastic or crosslinked polymer, is tinted. And the second glass sheet (organic or mineral) can be clear (colorless) and/or the first lower layer can be clear (colorless).

Furthermore, the first sheet may be tinted and/or one or any layer (athermal film, polymer support, barrier film, upper adhesive layer, in particular) above the intermediate layer can be tinted.

To do this, any tinted polymer layer according to the invention may comprise (in a polymer matrix) a coloring agent (organic or inorganic), in particular molecular dye or inorganic pigment.

A tinted film (athermal film, polymer support, barrier film, upper adhesive layer) may have a light transmission of at most 50% or 40% or 30% or 20% and at least 5%.

The first tinted upper layer, in particular adhesive and even crosslinked polymer, may have a light transmission of at most 50% or 40% or 30% or 20% and at least 5%. The first sheet can then be tinted or colorless and/or any other upper adhesive layer can then be tinted or colorless.

For a motor vehicle roof, for example, a tinted first upper layer (in particular an additional layer on the first upper adhesive layer or first upper adhesive layer) is chosen with a light transmission of less than 100% to 2%, preferably from 28% to 8%. For example, it is a thermoplastic film, such as tinted PVB, or the adhesive layer, and even tinted crosslinked polymer.

The exterior edge face or edge of the intermediate layer and even of the lamination interlayer, etc. is offset from the clear glass area, in particular intermediate layer extending under an internal peripheral masking layer between the second face and the intermediate layer.

The glazing may incorporate one or several functional (non-adhesive) elements that do not (significantly) contribute to the "cohesion" of the glazing.

One or more functional elements may be located between the second face and the intermediate layer or within the first upper layer or an additional upper layer (particularly within a thermoplastic adhesive layer or crosslinked material).

For example, the glazing (monolayer or multilayer) may incorporate one or more functional elements (preferably functional films), in particular of submillimeter-sized thickness and even at most 0.6 mm or 0.5 mm or 0.3 or 0.2 mm, and preferably at least 30 or 40 or 50 μm, preferably chosen from among at least one of the following functional films:
functional film (transparent, flexible, colorless or tinted), in particular polymer film, chosen from:
athermal, infrared-reflecting and/or heating film, e.g. polymer substrate with an electrically conductive (transparent) coating, in particular with a thickness of at most 0.4 mm, in particular local or extending over virtually the entire glazing, optionally distinct from the first lower adhesive layer or being the first lower adhesive layer, with the electrically conductive coating on the side opposite the intermediate layer,
electronic device (to a greater or lesser extent) chosen from at least one of the following devices: sensors; electrically controllable device having variable tint and/or scattering, additional diodes (emitting toward the first or second sheet), in particular local or extending over virtually the whole of the glazing, in particular facing or offset from the propagation zone, light extraction means, device between the second face and the first upper layer.

In particular, an upper adhesive layer according to the invention may comprise two adhesive thermoplastic films—or sheets—for example based on PVB (or a heat-crosslinked adhesive, for example a pressure-sensitive adhesive) and larger than the functional element (in particular electronic device or athermal film), and the functional element is between these two sheets. In particular, for a functional element (polymer film, electronic device, etc.) having a thickness of at least 0.4 mm, a peripheral intermediate sheet of the same nature as the two sheets, in particular based on PVB (or a thermally-crosslinked adhesive, for example a pressure-sensitive adhesive), surrounds and touches the edge face of the functional element and is between these two sheets, protruding and in contact therewith. This peripheral intermediate sheet forms part of the lamination interlayer. For a functional element having a thickness of less than or equal to 0.4 mm and even 0.3 mm or 0.2 mm, the thermoplastic material can creep sufficiently.

Preferably, for any functional element (in particular polymer film) according to the invention, a thickness of at least 30 or 40 μmor 50 μmis preferred for easy handling during assembly, and preferably at most 500 μm or 400 μmor 300 μm.

In particular, a functional element (film, particularly polymer, electronic device) with a thickness of at most 0.4 mm or 0.3 mm or 0.2 mm does not require a peripheral intermediate sheet.

Use may be made, for the athermal film, for example, of a clear coated PET film, for example XIR from Eastman, a coextruded PET-PMMA film, for example of the SRF 3M® type.

Naturally, a polymer functional film may be multifunctional (support, barrier, optical, etc.).

The extractor film may have a customized extent. It may be local or cover at least 50% of the clear glass area. The extractor film can have one or more local extraction zones (textured, etc.)

In one embodiment, at least one optical film is between the intermediate layer and one of the first upper or lower layers, in particular crosslinked polymer adhesive layers, and even in contact with the intermediate layer, and in that the optical film, in particular polymeric (thermoplastic, non-adhesive), is chosen from:

extractor film, forming a means of extracting guided light (in the intermediate layer)

and/or a local redirecting film, in particular a prismatic film (polymer, in particular polyester, in particular PET or PC), in particular a reflector between the intermediate layer and the first upper layer (in particular crosslinked polymer adhesive) or a transparent prismatic film between the intermediate layer and the first lower layer (in particular crosslinked polymer adhesive), forming means for redirecting light into the intermediate layer from a light source on the fourth or even offset face of the glazing.

Several disjointed extractor films (distributed in the clear glass area and/or offset from the clear glass area, etc.) can be used on the third face side and/or the second face side. The extractor film may be a thermoplastic or crosslinked (thermoset) polymer film.

It is preferred that the optical film (extractor or redirector) according to the invention be local, in particular to increase the contact surface of the first lower and upper layers with the intermediate layer, in particular adhesive contact if the first lower and upper layers are adhesive, preferably both crosslinked polymer.

Preferably, the local redirecting optical film (prismatic film, preferably reflecting and between the first upper layer and the intermediate layer, or transparent prismatic film between the first lower layer and the intermediate layer) is at most 10 cm or at most 5 cm or even at most 2 cm wide, and in particular of a length similar to that of the linear light source (customized). It can be a rectangular strip, for example, with rounded corners.

The extent of the (each) (local) extractor film may be significantly less than that of the intermediate layer. It advantageously represents less than 30%, preferably at most 25%, in particular between 1 and 10% of the extent of the intermediate layer.

The extractor film may have any shape. Several extractor films can have different shapes.

The optical film (local, extractor or redirector) can be in adhesive contact with the first lower or upper adhesive layer, preferably a crosslinked polymer.

It is also possible to use a thermoplastic polymer for the extractor film and to heat this polymer, before contact with the intermediate layer, at least locally to its softening point in order to position it on the first lower or upper layer, which is chosen to be a thermoplastic adhesive layer.

Yet another possibility consists in forming the extractor film by reaction injection-molding (RIM) a mixture of monomers culminating in the formation of a polymer thermoset in situ.

In one embodiment, the light extraction means (preferably local, in the clear glass area or not (under an internal masking layer) depending on requirements) comprise:

texturing of a so-called textured element chosen from the intermediate layer, or at least one of the first upper and lower layers, which is preferably an adhesive layer, in particular a crosslinked polymer, or an extractor film inserted between one of the first upper and lower layers, which is preferably an adhesive layer, in particular a crosslinked polymer, and the intermediate layer or a scattering layer comprising a binder and scattering particles and/or pores, inserted between one of the first upper and lower layers and the intermediate layer.

a local scattering zone of the intermediate layer comprising scattering particles and/or pores, in particular laser etching of a glass film.

The light extraction means (guided in the intermediate layer) can comprise an extractor film which is an optical film with reflective reliefs.

It is possible to use a film having reflective reliefs, in particular of a plastic film having a refractive index greater than or equal to n0 with reflective reliefs (prisms) forming light extraction as disclosed in patent WO2013/167832.

The reflecting relief preferably has a low roughness so that the reflection is essentially of the specular type. The relief and roughness of the reflecting interface are chosen in such a way that the total widths at mid-height of the angular distribution of the light intensity emitted by the system are preferably between 30° and 60°.

Independently of the roughness of the reflecting interface, it is possible to define a height or depth of the relief which is equal to the distance between the highest point and the lowest point of said relief. The height of the reflecting relief is between 5 μm and 1 mm, preferably between 10 μm and 500 μm, in particular between 20 and 100 μm.

Such polymer films textured by a relief are commercially available, and mention may for example be made of the film Vikuiti® Image Directing Film II sold by 3M.

The optical extractor film may comprise a plurality of individual prisms, each consisting of an oblique surface and a surface that is essentially perpendicular to the general plane of the second sheet.

An example of regular relief that can be mentioned is a relief of the Fresnel lens type or a relief of the Fresnel prism type.

The relief may be reflective by means of a layer having a refractive index lower by at least 0.04, preferably at least 0.1 than the index $n_0$ (like n1) or than the refractive index of the optical film with reliefs. The upper or lower layer, in particular a crosslinked polymer adhesive, can thus be used to reflect the relief. The hollows of the reliefs can be filled by the first upper or lower layer, in particular crosslinked polymer adhesive.

Alternatively or cumulatively, the guided light extraction means can comprise a scattering layer. This scattering layer comprises scattering elements in a binder or a matrix (transparent and even scattering), in particular defining at least one first scattering zone, for example having a width of at least 0.5 mm, in particular a first solid scattering zone and/or comprising a set of discontinuous patterns.

The guided light extraction means can also be a frosted textured area of the intermediate layer glass film or a scattering coating.

The scattering particles can be micrometer-sized, in particular at least 600 nm, in an organic or mineral binder. The particles can be made of metal or a metal oxide.

On the second face side, the extraction means can be totally opaque or transparent. on the third face side, the extraction means have non-zero light transmission.

The light source preferably comprises a set of light-emitting diodes on a diode support, for example flexible, in particular with a printed circuit (such as a printed circuit board, PCB), in particular an elongated, linear support, a straight or curved strip. Several strips can be provided which are connected to one another, along an edge, etc.

The light source can be located between the second and third faces. The diode support can be wholly or partly between the second and third faces, curved (flexible) to adapt to the curvature of the glazing, and even the diode support (particularly if diodes with lateral emission and/or support along the second or third face) protrude beyond the edge face of the glazing.

The diode support and diodes can be in an L- or U-shaped profile which is wholly or partly between the second and third faces (in a groove, within a framing layer, etc.), notably a curved (flexible) profile to adapt to the curvature of the glazing.

The light source can comprise an extracting optical fiber coupled with a primary light source (light-emitting diode(s), etc).

Preferably, the diodes are components that are surface mounted on the front face of a diode support which is a printed circuit board called PCB board (with conductive tracks).

The diodes for example have a Lambertian or quasi-Lambertian emission. The width (or length) of a diode with a single semiconductor chip, generally a square diode, is preferably at most 5 mm.

The width of the diode support (of the PCB board), preferably in strip form, is preferably at most 5 cm, better still at most 2 cm and even at most 1 cm.

It is possible to have one or more light sources (peripheral, preferably offset from the clear glass area), several sets of diodes. The source(s) are elongated, linear over at least 10 cm and/or more local, in particular in a hole or several separate holes of the intermediate layer or a peripheral layer (framing layer).

One or more (identical or different) light source(s) can be used, for example electrical and/or made up of light-emitting devices (LEDs, etc.). The one or more light source(s) can be mono- (emitting in the blue, green, red, etc. domain) or polychromatic, or can be adapted or combined to produce, for example a white light, etc.; they can be continuous or discontinuous, etc.

The light source may be extended linearly (rectangular strip like a diode array) along one side of the glazing (longitudinal edges) or duplicated (with similar or distinct light, for example other color, intensity, controlled independently or simultaneously) along both sides (longitudinal edges).

The light source, preferably a set of light-emitting diodes (on a diode support), can be located under the second face:
  bonded to the second face (by an upper adhesive layer or not, if upper adhesive layer is more recessed)
  and even between the second face and the third face, in particular bonded to the second face or to the third face and/or bonded to the intermediate layer.

The light source can be coupled to the edge face of the intermediate layer and all or part of it can be exterior to the edge face of the glazing. The light source (the diodes and even the diode support) may be housed in a polymer encapsulation, as described in application WO2010049638 in particular in FIG. 15 or in FIG. 16 and even having a recess for removal, replacement of the source.

The injection of light from the light source, which preferably comprises a set of light-emitting diodes on a diode support, into the intermediate layer (in particular non-adhesive thermoplastic or glass film) is preferably:
  1) by an edge face of the intermediate layer (in particular a non-adhesive thermoplastic or glass film) or a wall delimiting a closed hole (blind or through) of the intermediate layer, with the light source in contact with or at a distance from said edge face or wall (gap or material, in particular adhesive), the light source preferably being under the second face and even between the second face and the third face.

Optionally, the light source is in a notch of the edge face of the intermediate layer (in particular non-adhesive thermoplastic or glass film) or is bonded to or embedded in a wall delimiting a closed hole of (or in the vicinity of) a transparent framing layer (for optical coupling via the edge face) which may optionally be adhesive around the perimeter of the edge face of the intermediate layer.

Or the injection is:
  2) by a light redirecting element, local such as an optical redirecting film, preferably on the second main face side (or third main face side), in particular prismatic film in contact with the intermediate layer and between the intermediate layer and one of the first upper or lower layers, the light source then facing or being offset from the fourth main face, in particular light source and light redirecting element offset from a clear glass area.

The light source beam can be normal or inclined.

In particular, the optical coupling is direct or by means of an optical system, in particular light source and light redirecting element offset from a clear glass area, and facing an internal masking layer.

The electricity power supply of the light source (diodes) can be provided by a current feed integrated in the laminated glazing, for example an electric wire incorporated in the lamination interlayer, or this electric wire even can be applied onto the fourth main face of the second sheet (interior sheet, passenger compartment side), and optionally can be protected by a cover.

The light source can be on the fourth face, below (opposite) the internal masking layer, and is coupled to the intermediate layer via a redirecting optical film as already disclosed.

The light source on the fourth face side may be associated with a collimating optics. The light source with an optional collimator can be attached on the fourth face, by direct bonding or by being spaced apart and on a peripheral support attached to the fourth face.

The optional interior peripheral masking layer (on face F4) may comprise a gap in order not to block the optical coupling, in particular to allow the rays from the light source to pass toward the light-redirecting element.

This redirecting (transparent) film is for example of longitudinal shape along the glazing or rounded at the corners, for example of the length of the clear glass area. This redirecting film may have a thickness of at most 0.5 mm or 0.4 mm and in particular of at least 0.1 mm.

The redirecting film and/or the light source is for example at most 100 mm from the clear glass area and/or preferably at least 10 or 20 mm.

By means of this redirecting film between the second face and the third face, the light passing through the second sheet, all or part of the intermediate layer is redirected into the intermediate layer by reflection, or even scattering.

The redirecting optical film can be textured or even prismatic (between face F2 and F3). The prismatic film has a smooth (non-textured, non-functional) main surface and a textured, functional opposite surface. The prismatic film is therefore flexible and curved to adapt to the curvature of the glazing. The prismatic film can comprise a partially structured transparent plastic film forming (micro)prisms or a transparent (planar) plastic film (e.g. polyester, in particular PET or PC) with a transparent layer (e.g. organic resin) with an arrangement of (micro)prisms on one main surface. The (micro)prisms are oriented toward the third face or toward the second face.

The prismatic film on the second face side (between face F2 and F3), between the intermediate layer and the first upper layer, can be reflective, with a reflective layer (metallic, etc.) on the (micro)prisms, and the reflective (micro) prisms are oriented toward the second face or the third face.

Preferably, the prismatic (preferably) reflective film is between the intermediate layer and the first upper layer, and even bonded to or in contact with the intermediate layer (prisms facing the second or third face), In particular, the prismatic (preferably) reflective film is 100 to 300 μm thick, preferably at most 150 μm. The prismatic film on the third face side (between face F2 and face F3, between intermediate layer and the first upper layer) can be with the (micro)prisms facing the second or third face.

Preferably, the transparent prismatic film is between the intermediate layer and the first lower layer, and even in contact with the intermediate layer (prisms oriented toward the second or third face), In particular, the prismatic transparent film is 100 to 300 μm thick, preferably at most 150 μm.

The intermediate layer may be protected if necessary from moisture, dust, the outside environment for better durability.

In one embodiment, a so-called framing layer surrounds the perimeter of the intermediate layer, preferably a thermoplastic or crosslinked polymer adhesive layer in contact with the intermediate layer and even optionally in adhesive contact with the third face (bare or coated) or with the first lower and/or upper layer and/or in contact with the second face (bare or coated) or with the first upper layer, in particular a framing layer offset from a clear glass area.

The peripheral (adhesive) framing layer can be on the perimeter of the intermediate layer and even on the perimeter of one or more other layers under or on top of the intermediate layer.

The framing layer can surround the perimeter of the edge face of the intermediate layer and even of one or more first lower and upper layers (preferably crosslinked polymer adhesive and even of all layers between second and third faces), preferably a thermoplastic (especially PVB) or crosslinked polymer adhesive layer.

The framing layer preferably has a thickness at least equal to the thickness of the intermediate layer. The framing layer is, for example, at least 1 mm and at most 5 cm or 1 cm wide (and offset by a clear glass area, under an internal masking layer).

The framing layer may be a thermosetting mastic (two-component photo-crosslinked photo-cross section), forming a seal, and even spaced apart or alongside the first lower and upper layers (which itself is recessed from the edge faces of the sheets). The framing layer may be in adhesive contact with the second face and the third face. The framing layer may be, for example, polyurethane, epoxy, butyl, etc.

The framing layer can be made of the same material as the first upper and/or lower adhesive layer.

The framing layer may surround the guided light propagation zone and/or it is preferably outside the clear glass area.

In the case where the first upper and/or lower adhesive layer (of film) extends beyond the edges of the intermediate layer, the framing layer may be used to compensate for the thickness of the intermediate layer. It can bridge the gap between projecting upper and/or lower first adhesive layers.

The first upper and/or lower, particularly thermoplastic and even PVB adhesive layer can project from the intermediate layer and even without any discernible interface with a particularly thermoplastic and even PVB framing layer around the perimeter of the intermediate layer.

The crosslinked polymer material of an additional crosslinked polymer adhesive layer (under or on the first upper or lower layer) or of a framing layer may comprise (substantially) a polymer selected from polyacrylate-based polymers, in particular urethane acrylate-based polymers, or epoxy polymers (resin, etc.) or polyepoxides, polyester, polyurethane, polyvinyl acetate.

With regard to the extent of the elements, several configurations are possible, in particular the edge face of the intermediate layer, the lower and/or upper first (adhesive) layer or even the framing adhesive layer is not necessarily aligned with the edge face of the first and/or second sheets. The edge faces of the layers between the second and third faces are not necessarily aligned with one another.

The intermediate layer can be recessed from the edge face of the first sheet. Recess width may depend on light injection
  for example, the recess is at least 10 mm to place the light
    source (diodes) under the distant second face or in
    contact with the edge face of the intermediate layer
    (edge face with notch, etc.) and even between the
    second face and the third face recess of n0 more than 10 mm or even n0 more than 2 mm, particularly if the source is in a closed hole in the intermediate layer.

The first upper and/or lower adhesive layer (preferably both crosslinked polymer adhesive) can be recessed from the edge face of the first sheet by at most 10 mm or even at most 2 mm. The edge face of the first upper and/or lower layer (preferably both crosslinked polymer adhesive) can be aligned with the edge face of the intermediate layer or project beyond the intermediate layer.

In one embodiment, the glazing comprises an internal, peripheral, opaque masking layer between the third face and the second face, and even covering the perimeter of the intermediate layer, in particular in contact with the second main face, notably defining a clear glass area. And it optionally comprises, in particular when the second sheet is an interior glazing, a peripheral, opaque, interior masking layer, on the fourth main face, in particular congruent with or narrower than the width of the internal masking layer.

The glazing can therefore comprise an internal, opaque, peripheral masking layer, in particular an enamel (black, etc.) on the second face, between the second face (in particular F2) and the third face (in particular F3). This can be an opaque coating on a thermoplastic adhesive layer (in particular additional upper adhesive layer), in particular PVB, e.g. an opaque PVB-based coating with coloring agent on one main face of a PVB layer (in particular additional upper adhesive layer) oriented toward the second or third face.

The internal masking layer can be 2 mm or 3 mm (less than 5 mm) from the edge face of the glazing, or can even go up to the edge face. The masking layer can be a band framing the glazing (windshield, roof, etc.) particularly in black. Opacifying is carried out over the entire periphery to conceal bodywork elements or seals or to protect an adhesive for mounting on the vehicle. This internal masking layer delimits the clear glass area. It may be advantageous for the external edge of the intermediate layer (and even first lower or upper layer, or additional or even framing layer) to be masked by the internal masking layer, not in the clear glass area.

The width of the internal masking layer along the sides of a motor vehicle roof is generally less than that at the front or even at the rear.

In the case where the first sheet is the exterior glazing, another masking layer, referred to as interior masking layer, can be on face F4 on the passenger compartment side, in particular facing toward the internal masking layer (and even of identical nature, for example an enamel, particularly a black enamel, on the second sheet made of mineral glass). It may be adjacent to an optional transparent functional coating, in particular athermal, which is at least in the clear glass area.

In particular for an automobile roof (first sheet is the exterior glazing):

the width of the internal (and even interior) masking layer along the longitudinal edges can be at most 30 cm, in particular 10 to 20 cm, the width of the internal (and even interior) masking layer along the rear lateral edge can be at most 30 cm, in particular at least 1 or 5 cm, and along the front lateral edge at most 60 cm, in particular at least 1 or 5 cm.

The width of the internal masking layer is preferably greater than that of the interior masking layer.

The internal and/or interior masking layer may be an organic or mineral binder (sintered glass frit) with an organic or inorganic coloring agent, in particular molecular dye or inorganic pigment.

The internal and/or interior opaque masking layer is preferably a continuous layer (flattened with a solid edge or alternatively a gradient edge (set of patterns).

The thickness of layer(s) between second face and third face is preferably at most 1.1 mm or 0.9 mm and in particular the thickness of lamination interlayer (of one or several adhesive thermoplastic and/or crosslinked polymer layers) being at most 1.1 mm or 0.9 mm, at least in the guide zone The thickness between first face and fourth face is preferably at most 9 mm or 7 mm, in particular for a road vehicle, The first sheet is preferably made of mineral glass, optionally tempered, particularly if it is to be the exterior sheet, and the second sheet is made of organic glass. In particular for a road glazing, the first (exterior) sheet is preferably at most 2.5 mm thick, even at most 2.2 mm thick—in particular 1.9 mm, 1.8 mm, 1.6 mm and 1.4 mm—and even at least 0.7 mm.

In particular, the first sheet is the external sheet, and even made from mineral glass, and the glazing is chosen from a roof, a windscreen and a side window.

Alternatively, the first sheet can be the internal sheet and, in particular, the glazing is chosen from a windscreen, a side window, a rear window, a rear door glazing, and in particular the external sheet is made of mineral glass, in particular tempered glass.

In particular, the second sheet can be the second sheet intended to be the interior sheet, in particular with a thickness of at least 0.7 mm, possibly less than that of the first exterior glass sheet, even by up to 2.2 mm—in particular 1.9 mm, 1.8 mm, 1.6 mm and 1.4 mm—or even by up to 1.3 mm or by up to 1 mm/

The total thickness of the first and second sheets of glass is preferably strictly less than 5 or 4 mm, even 3.7 mm.

The first and second glass sheets can be substantially identical in size, e.g. generally rectangular. The first sheet (if exterior) may be larger than the second sheet (if interior), thus protruding beyond this second sheet over at least part of the periphery thereof, thus optionally second sheet (passenger compartment side) that is smaller with an edge face that is recessed, in particular by at most 10 or 5 cm, from the edge face of the first glass sheet, on one edge or several (longitudinal and/or lateral) edges in particular or over the entire periphery.

The first sheet may be a clear glass with an athermal functional coating on the second face, and the first upper layer (adhesive, thermoplastic or crosslinked polymer) is tinted or clear.

The first mineral glass sheet may be based on silica, soda-lime, preferably soda-lime-silica, or even aluminosilicate or borosilicate. It may have a total iron oxide content by weight (expressed in the form $Fe_2O_3$) of at most 0.4% and preferably of at most 1.5%.

The second mineral glass sheet may be based on silica, soda-lime, soda-lime-silica, aluminosilicate or borosilicate. To limit the absorption has a total iron oxide content by weight (expressed in the form $Fe_2O_3$) of at most 0.05% (500 ppm), preferably of at most 0.03% (300 ppm) and of at most 0.015% (150 ppm) and particularly greater than or equal to 0.005%. The redox of the second glass sheet is preferably greater than or equal to 0.15.

In the present text, the light transmission is calculated from the transmission spectrum between 380 and 780 nm, taking into account the illuminant A and the CIE 1964 standard observer (10°).

The light transmission and the hue of each of the glass sheets are adjusted by virtue of the chemical composition of the glass and the thickness of the glass sheet. The chemical composition of the glass comprises a colorless base, preferably soda-lime-silica base (but other glasses can be used, in particular borosilicate or aluminosilicate glasses), as well as a coloring part. The coloring part in particular comprises one or more dyes chosen from transition metal oxides—in particular iron oxides (ferrous and ferric oxides), cobalt oxide, chromium oxide, nickel oxide, rare earth oxides, in particular erbium oxide, and selenium.

A sheet of clear glass is a sheet having for example a light transmission of at least 85%, or even of at least 90%. It generally does not comprise a coloring part except for inevitable impurities, in particular iron oxides, in a total content of between 0.005 and 0.200% by weight, especially between 0.010 and 0.150% by weight, or even between 0.030 and 0.120% by weight.

A sheet of tinted glass is a sheet of glass having for example a light transmission between 50 and 80%, in particular between 60 and 75%. It comprises a coloring part, for example composed of iron oxides, in a total content of between 0.4 and 1.2% by weight, especially between 0.6 and 1.1% by weight. The glasses obtained are then green, optionally to yellow or green-blue according to the proportion of ferrous iron. According to other examples, cobalt oxide, selenium and/or erbium oxide are added in order to confer a hue, for example blue or gray.

A sheet of supertinted glass is a sheet of glass having for example a light transmission between 5 and 50%, in particular between 8 and 40%. It comprises a coloring part, for example composed of iron oxides, in a total content of between 1.0 and 2.3 by weight, in particular between 1.1 and 2.0% by weight, as well as cobalt and chromium oxides and/or selenium. The coloring part comprises, for instance, the following dyes, in the weighted proportions defined below: $Fe_2O_3$ (total iron) from 1.2 to 2.3%, particularly from 1.5 to 2.2%, CoO from 50 to 400 ppm, particularly from 200 to 350 ppm, Se from 0 to 35 ppm, particularly from 10 to 30 ppm. The redox is preferably between 0.1 and 0.4, particularly between 0.2 and 0.3. Redox is the weight ratio of the content of ferrous iron (expressed as FeO) to the total iron content (expressed as $Fe_2O_3$). The glasses obtained are in particular green or gray.

The second sheet may be made of organic glass in particular based on polyurethane (PU), typically with n'v of approximately 1.47, on polycarbonate (PC), typically with n'v of approximately 1.59, on polymethyl methacrylate (PMMA), typically with n'v of approximately 1.47, on polyvinyl chloride (PVC), with n'v of approximately 1.54.

The second organic glass sheet can be flexible to follow the curvature of the first bent sheet, or the second organic glass sheet can be preformed.

With an organic glass such as PC or PMMA, thermoplastic polyurethane (TPU) or else a crosslinked polymer material is preferable (for more chemical compatibility) to PVB as lower thermoplastic adhesive layer. It is also possible to choose thermoplastic or thermoset EVA.

The first glass sheet may preferably be made of tempered glass if the second sheet is made of organic glass.

In the present invention, the expression "tempered glass" means thermally tempered glass in the absence of any precision, and preferably glass tempered during an operation of bending the glass.

The second face (in particular with a first colorless glass sheet and an upper tinted adhesive layer, first additional layer or other layer) can have a functional coating (stack of thin layers, etc.) that is athermal or heatable, comprising an electrically conductive coating (low emissivity, heatable). The electrically conductive coating can be a stack of thin layers, with one or more metal layers (silver, etc.) between layers, for example of metal oxide or nitride or oxynitride. The electrically conductive coating is less than 200 nm and even 160 nm thick. The electrically conductive coating may be in contact with an optionally tinted layer which is:

the first upper preferably adhesive layer (thermoplastic or crosslinked polymer)—an additional adhesive layer, thermoplastic (PVB, etc.) or crosslinked polymer, non-adhesive thermoplastic film (PET, etc.).

In particular, the first sheet is made of clear or extra-clear mineral glass and the electrically conductive coating is in contact with a tinted layer that is crosslinked polymer adhesive (first upper adhesive layer) or thermoplastic adhesive (PVB, EVA, etc.), e.g. additional upper adhesive layer on the first upper crosslinked polymer adhesive layer.

A coating is a low-emissivity coating, in particular with a normal emissivity which is preferably less than 0.50, in particular 0.30 and even 0.20 or 0.10. It is preferably a stack of thin layers comprising at least one (in particular two, three or four) silver layer (preferably on the second face or on a film between the second face and the first additional upper layer) or a layer of a transparent conductive oxide (preferably on the face F4), in particular selected from indium tin oxides, aluminum-doped zinc oxide or gallium-doped zinc oxide, or tin oxides doped with fluorine or antimony. These functional layers are generally interposed between dielectric layers based on oxides, nitrides and/or nitrides. The thermal comfort of occupants is further enhanced by the presence of such a stack, particularly for a roof, an ITO-based stack on face F4.

The invention also relates to a motor vehicle, in particular a road vehicle or an automobile, incorporating the previously defined light-emitting glazing.

When mounted in position in the motor vehicle, in the case of a laminated roof, the fourth face preferably is the inner face of the motor vehicle, conventionally called face F4. The roof can be an opening or fixed roof.

The first sheet may be the external sheet in particular, the glazing is chosen from a roof, a windshield, a side window, or the first sheet is the internal sheet in particular, the glazing is chosen from a windshield, a side window, a rear window, a rear door glazing.

The laminated glazings are generally bent, in particular in one or two directions, in order to fit perfectly into the vehicle body.

The invention also relates to a method. The manufacture of the light-emitting glazing according to the invention may comprise:

assembling the first glass sheet (preferably mineral), the first lower layer, the intermediate layer (preferably non-adhesive thermoplastic film or glass), the first upper layer and the second glass sheet, the first lower and/or upper layer is a PSA film or a so-called post-adhesive film of polymer material partially photo-crosslinked prior to assembly or a coating on a polymer (thermoplastic, non-adhesive) or glass (ultrathin) support, in particular a support forming the first upper or lower layer or said intermediate layer.

The manufacture of the (laminated) light-emitting glazing according to the invention may comprise:

assembling the first glass sheet (preferably mineral), the first lower layer, the intermediate layer (preferably non-adhesive thermoplastic film or glass), the first upper layer and the second glass sheet (mineral or organic), the method comprising, prior to assembly, the liquid deposition of a crosslinkable adhesive, particularly photo-crosslinkable, of the first lower and/or upper adhesive layer (on the second and/or first glass sheet or the intermediate layer, and preferably the method comprises photo-crosslinking of the first lower and/or upper layer, particularly by UV(A).

The assembly refers to the stack of the different elements.

Laminating the light-emitting glazing according to the invention may comprise an operation which enables adhesive contact of crosslinked polymer adhesive layer(s) according to the invention of the lamination interlayer (first lower and/or upper adhesive layer, additional lower and/or upper adhesive layer) with the second and third faces, for example. If the crosslinked polymer adhesive layer(s) is (are) of the PSA type, adhesive contact is made by simple contact (with one or both second and third faces or with one or both first lower and/or upper layers).

Preferably, the lamination of the light-emitting glazing according to the invention comprises at least a degassing of the assembled elements (already in adhesive contact or in non-adhesive contact) in order to avoid bubbling, and pressure is applied to the assembled elements.

After assembly, the lamination of the light-emitting glazing according to the invention may thus involve, for example, degassing (oven, etc.) and autoclaving (positive pressure). The lamination may involve a step of (photo-) crosslinking of crosslinked polymer adhesive layer(s) (first lower and/or upper adhesive layer, additional lower and/or upper adhesive layer), which are optionally already partially photo-crosslinked before the assembly, for example with the aid of a UVA source.

The autoclave cycle may be at ambient temperature, at a temperature in a range extending from 30-50° C. at a pressure in a range extending from 2 to 5 bars and for a period of at most 1 h, in particular of at least 15 min.

When the light-emitting glazing according to the invention comprises a thermoplastic adhesive layer, such as PVB, the laminating of the glazing according to the invention comprises evacuation, and pressurization with heating, the laminating step leading to the adhesive contact of the thermoplastic adhesive layer with the adjoining layer, for example on the second face (and on the other face in contact with the intermediate layer or first upper layer).

A crosslinked polymer adhesive layer according to the invention (first lower and/or upper adhesive layer, additional lower and/or upper adhesive layer) can be obtained from a crosslinkable adhesive (UV or two-component crosslinkable by chemical reaction) which is deposited on a surface. A pre-crosslinking step (UV or chemical reaction advancement) is advantageous to gel the crosslinkable adhesive. A vacuum is then created in order to evacuate the trapped air and complete the crosslinking in order to obtain good adhesion.

In short:

in the case of a lamination interlayer comprising one or more OCA films and free of thermoplastic adhesive film, the method for manufacturing the light-emitting glazing according to the invention may comprise laminating by calendering or using a vacuum press, followed by autoclave treatment (to eliminate residual air bubbles and optimize adhesion).

in the case of an interlayer comprising at least one thermoplastic adhesive film (in addition to an OCA film or even an OCA coating), the method for manufacturing the light-emitting glazing according to the invention can comprise laminating by autoclave treatment, for example at temperatures of 110 to 160° C. and pressures of 10 to 15 bar, and even prior to autoclave treatment, the air trapped between the glass sheets and the lamination interlayer is removed by calendering or vacuum.

Other details and advantageous features of the invention will become apparent upon reading the examples according to the invention shown by the following figures.

FIG. 1 shows a schematic cross-sectional view of a light-emitting laminated glazing for a motor vehicle according to the invention in a first embodiment.

FIG. 1' shows a schematic front view of the glazing of FIG. 1.

FIG. 2 shows a schematic cross-sectional view of a light-emitting laminated glazing for a motor vehicle in a second embodiment.

FIG. 2' shows a schematic cross sectional view of the laminated light-emitting glazing for a motor vehicle which is a roof mounted in a vehicle.

FIG. 3 shows a schematic cross-sectional view of a light-emitting laminated glazing for a motor vehicle in a third embodiment.

FIG. 3' shows a schematic front view of the glazing of FIG. 3.

Figure 5:
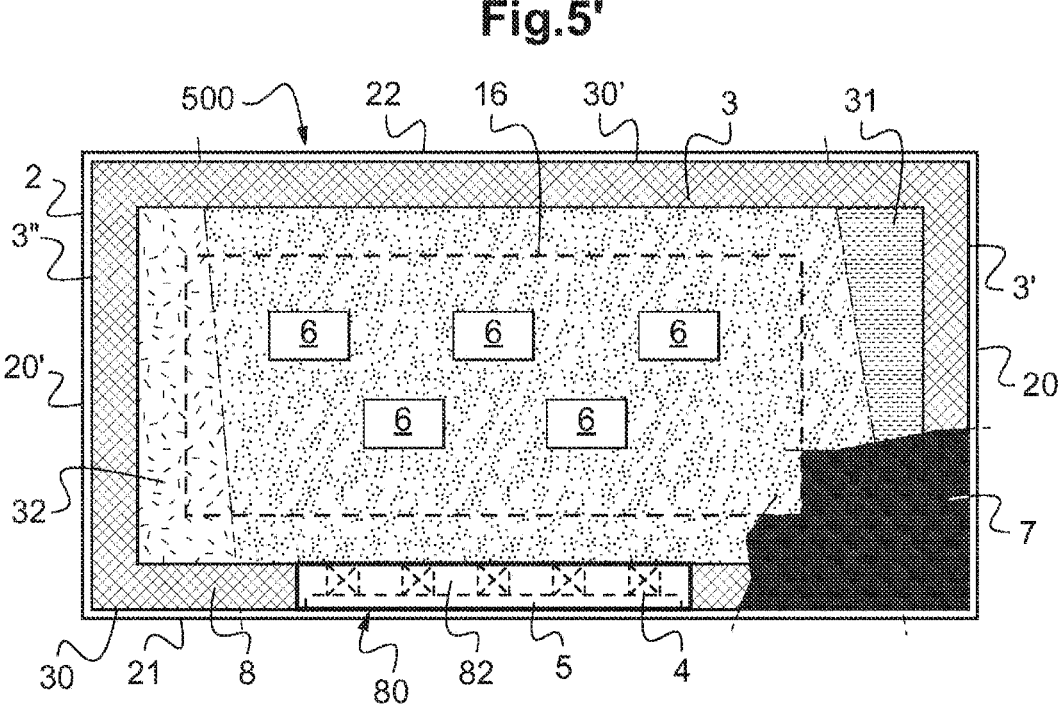
FIG. 5 shows a schematic cross-sectional view of a light-emitting laminated glazing for a motor vehicle in a fifth embodiment.

FIG. 5' shows a schematic front view of the glazing of FIG. 5.

Figure 6:
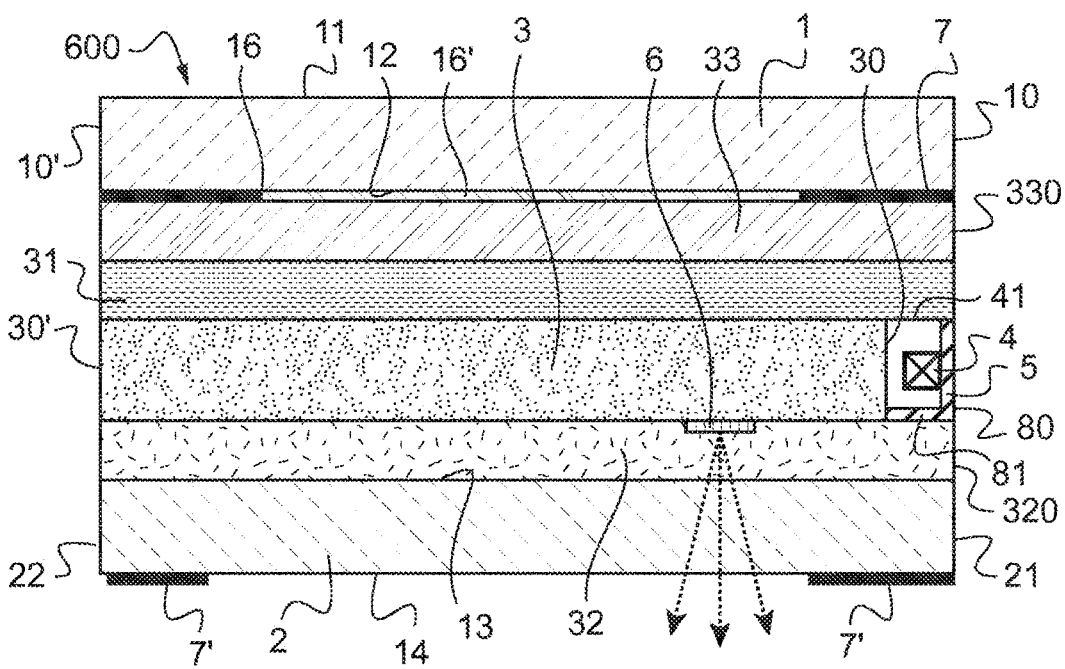

FIG. 6 shows a schematic cross-sectional view of a light-emitting laminated glazing for a motor vehicle in a sixth embodiment.

Figure 7:
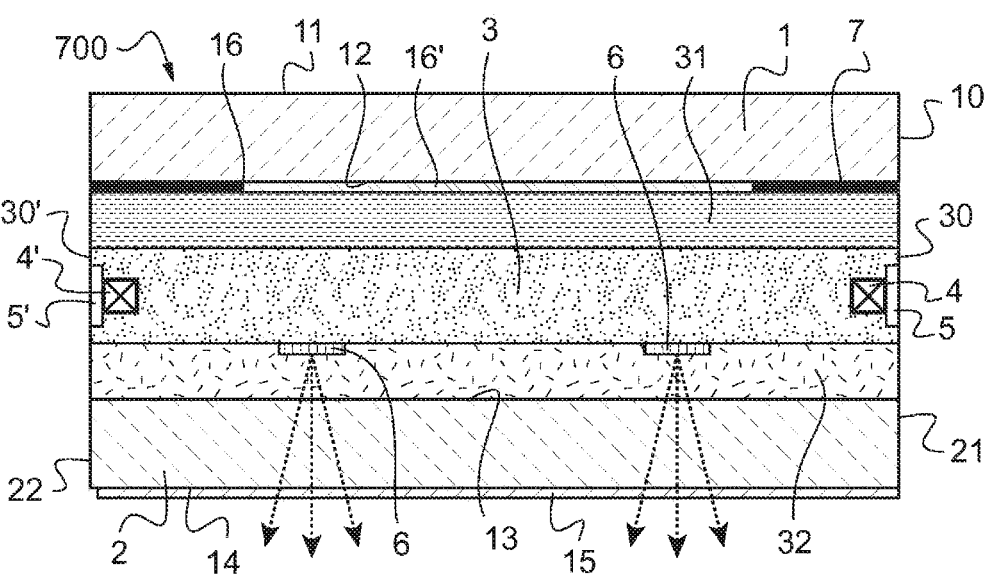
Figure 7:
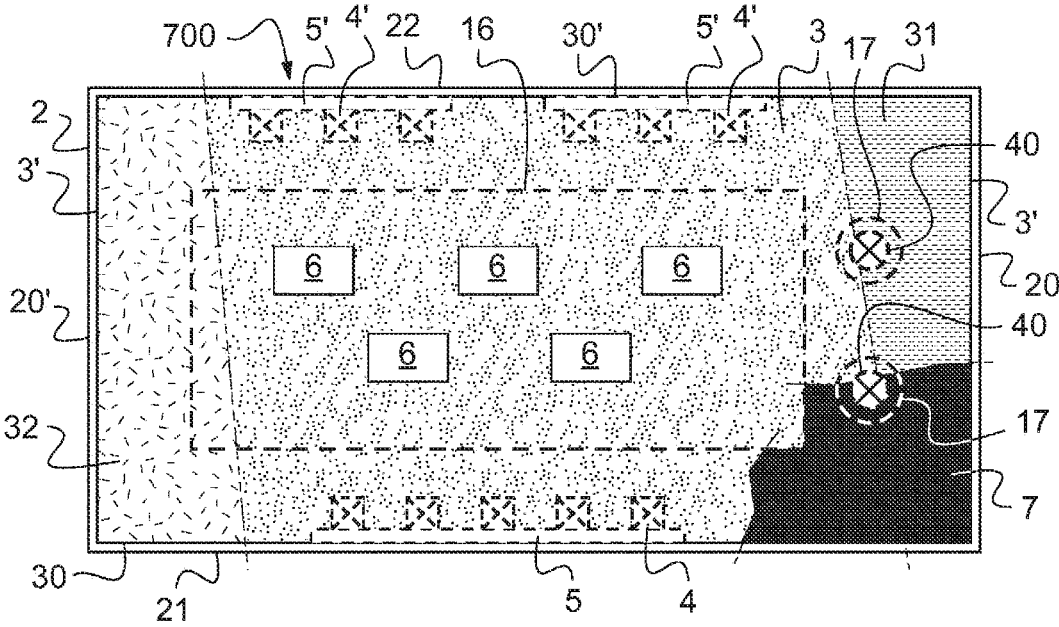

FIG. 7 shows a schematic cross-sectional view of a light-emitting laminated glazing for a motor vehicle in a seventh embodiment. FIG. 7' shows a schematic front view of the glazing of FIG. 7.

Figure 8:
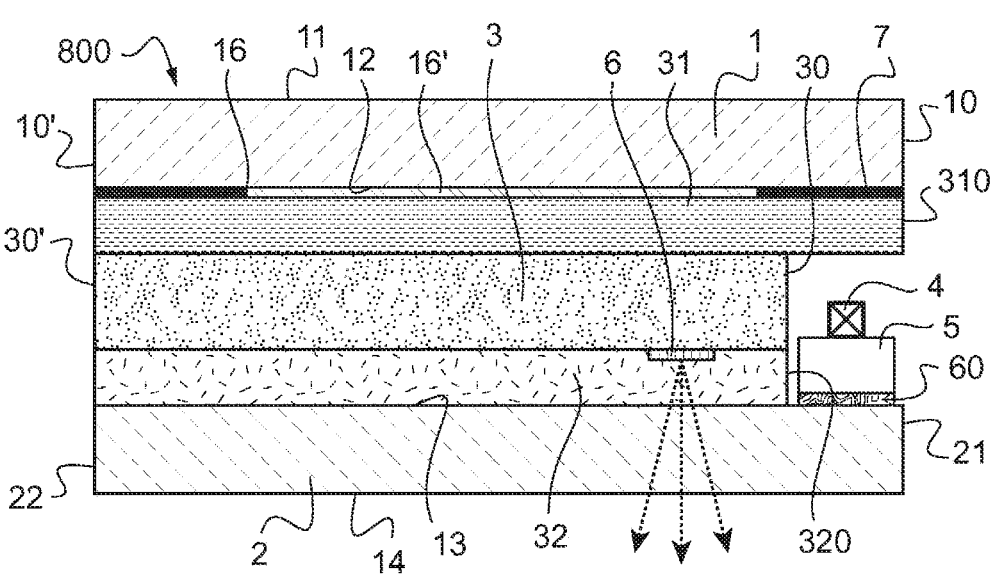
Figure 8:
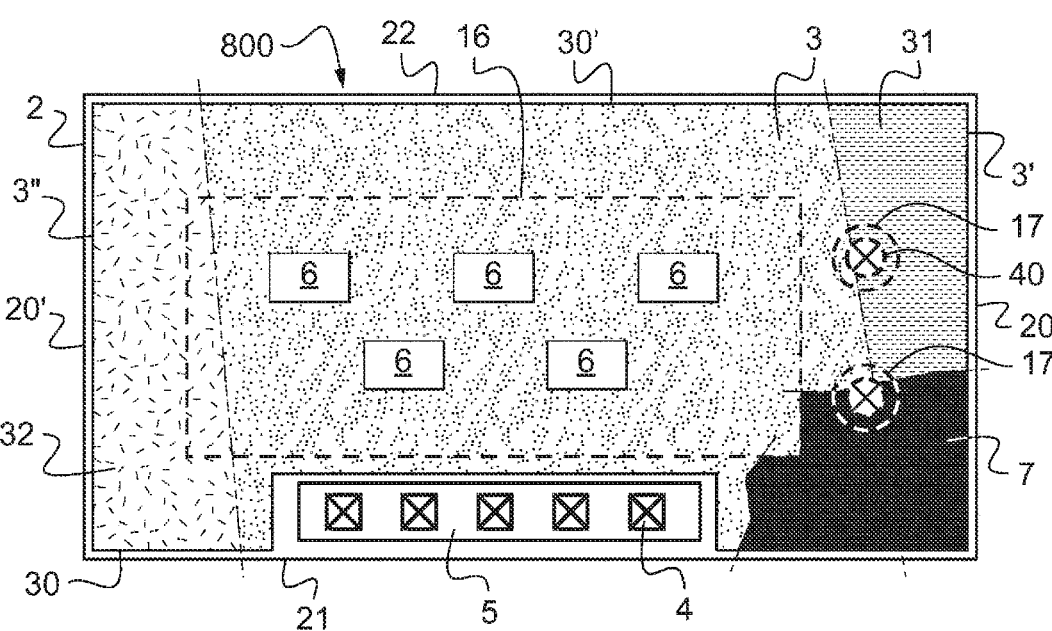

FIG. 8 shows a schematic cross-sectional view of a light-emitting laminated glazing for a motor vehicle in an eighth embodiment. FIG. 8' shows a schematic front view of the glazing of FIG. 8.

Figure 9:
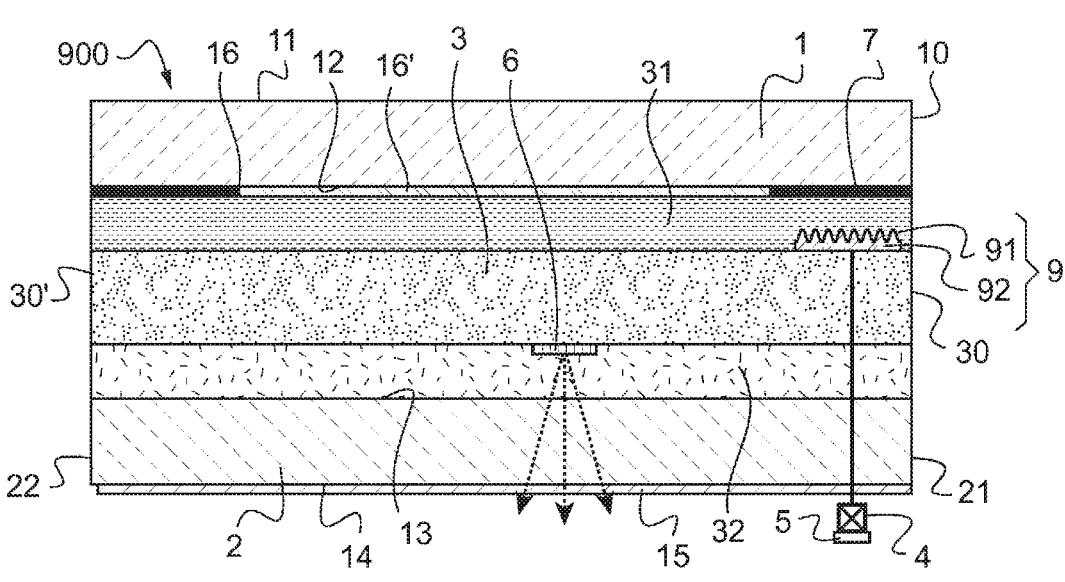

FIG. 9 shows a schematic cross-sectional view of a light-emitting laminated glazing for a motor vehicle in a ninth embodiment.

Figure 10:
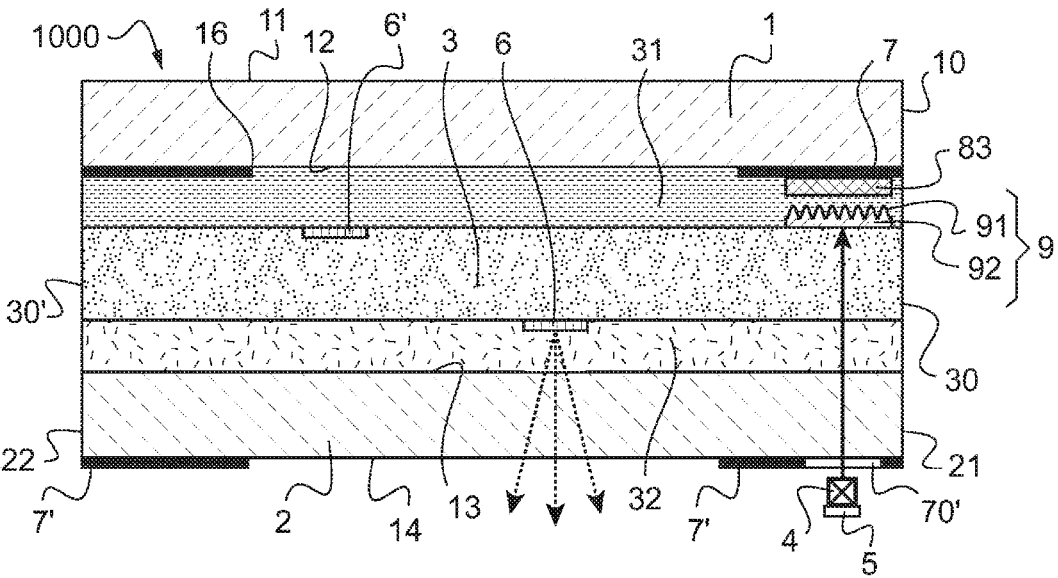

FIG. 10 shows a schematic cross-sectional view of a light-emitting laminated glazing for a motor vehicle in a tenth embodiment.

Figure 11:
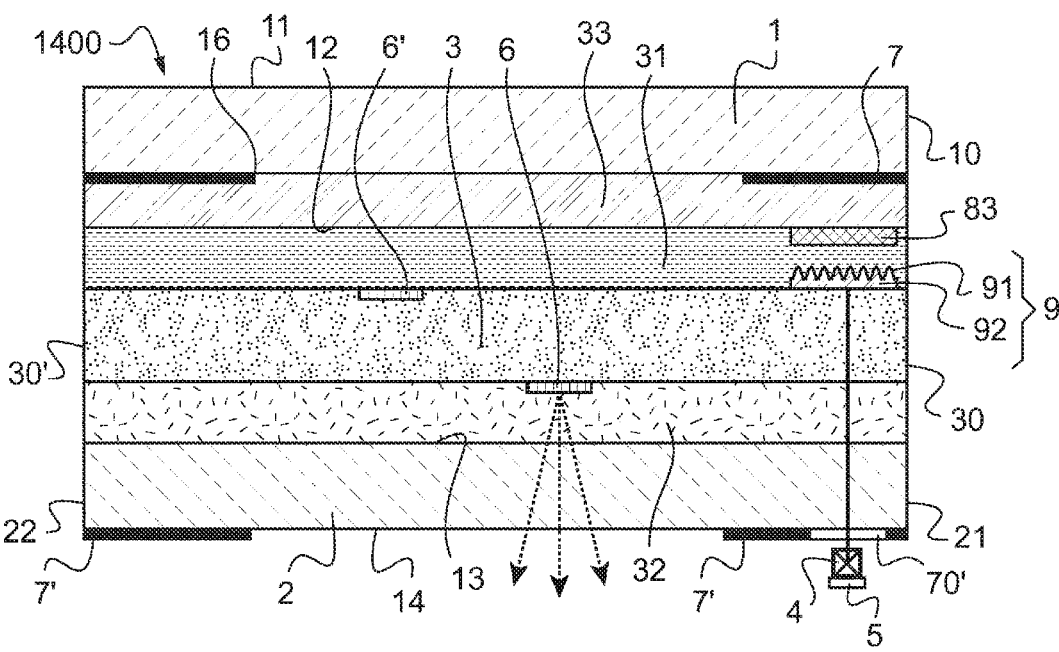

FIG. 11 shows a schematic cross-sectional view of a light-emitting laminated glazing for a motor vehicle in an eleventh embodiment.

Figure 12:
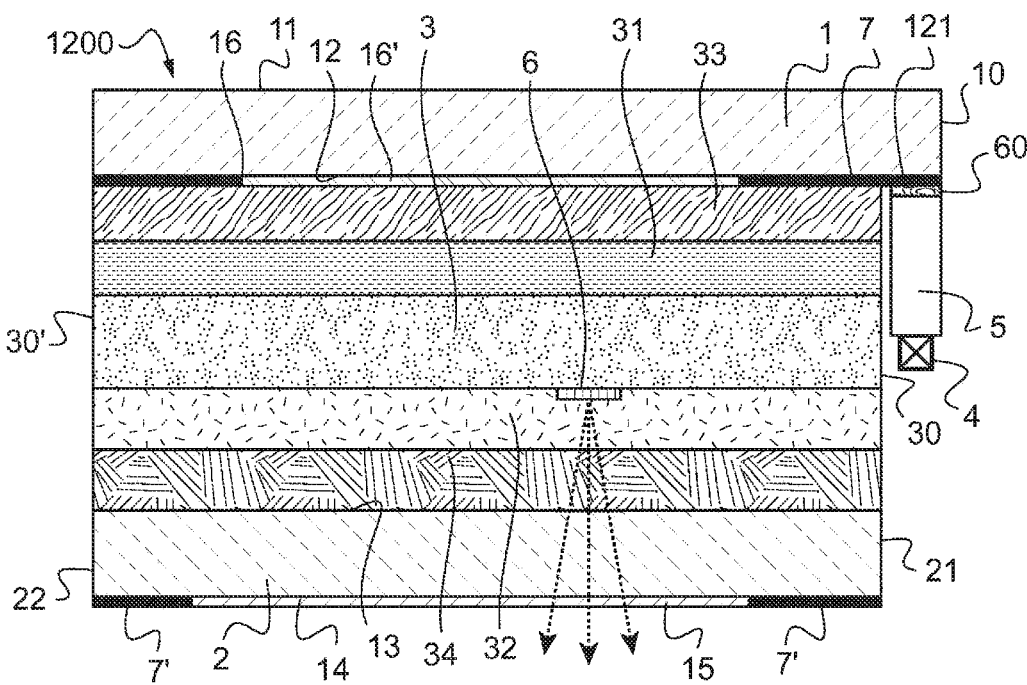

FIG. 12 shows a schematic cross-sectional view of a light-emitting laminated motor vehicle glazing in a twelfth embodiment by injection of peripheral light.

Figure 13:
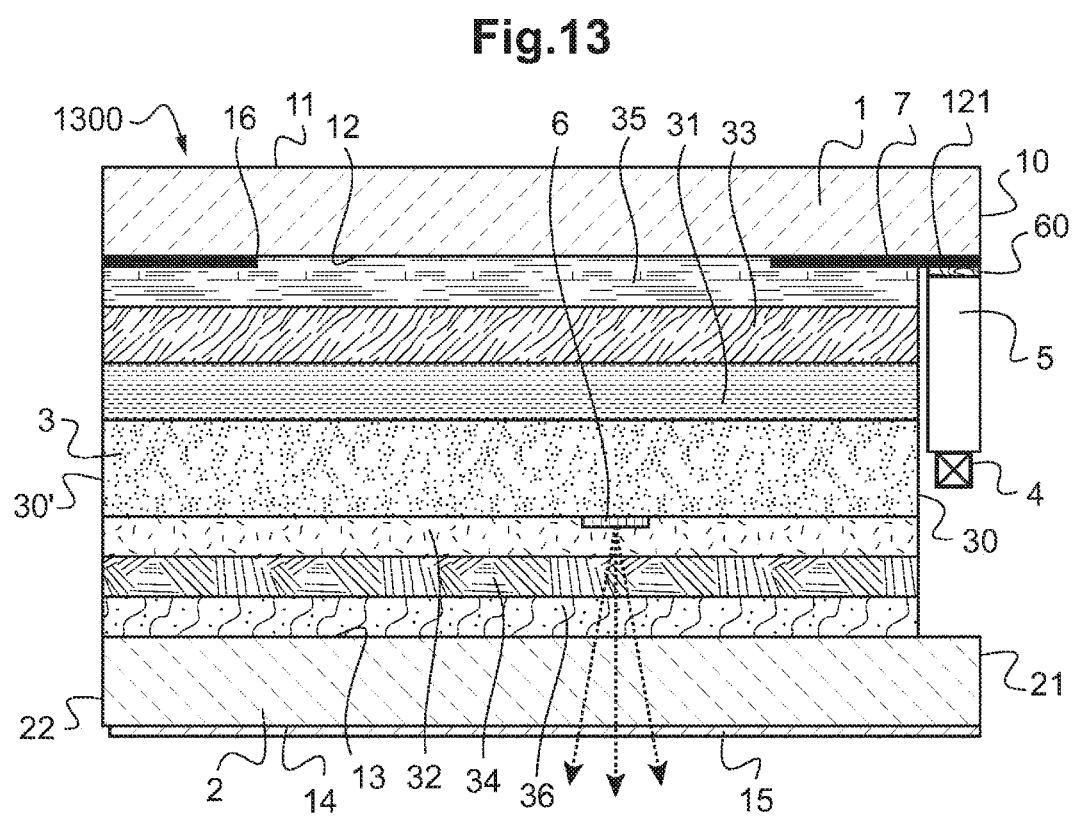

FIG. 13 shows a schematic cross-sectional view of a light-emitting laminated glazing for a motor vehicle in a thirteenth embodiment.

For the sake of clarity, it should be noted that the various elements of the objects that are shown are not necessarily reproduced to scale.

Figure 1:
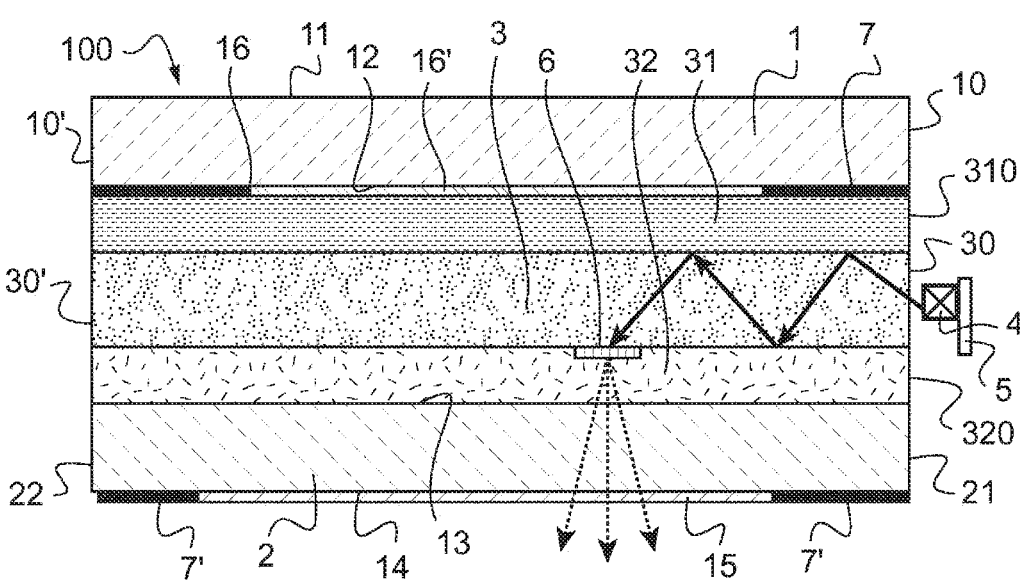
Figure 1:
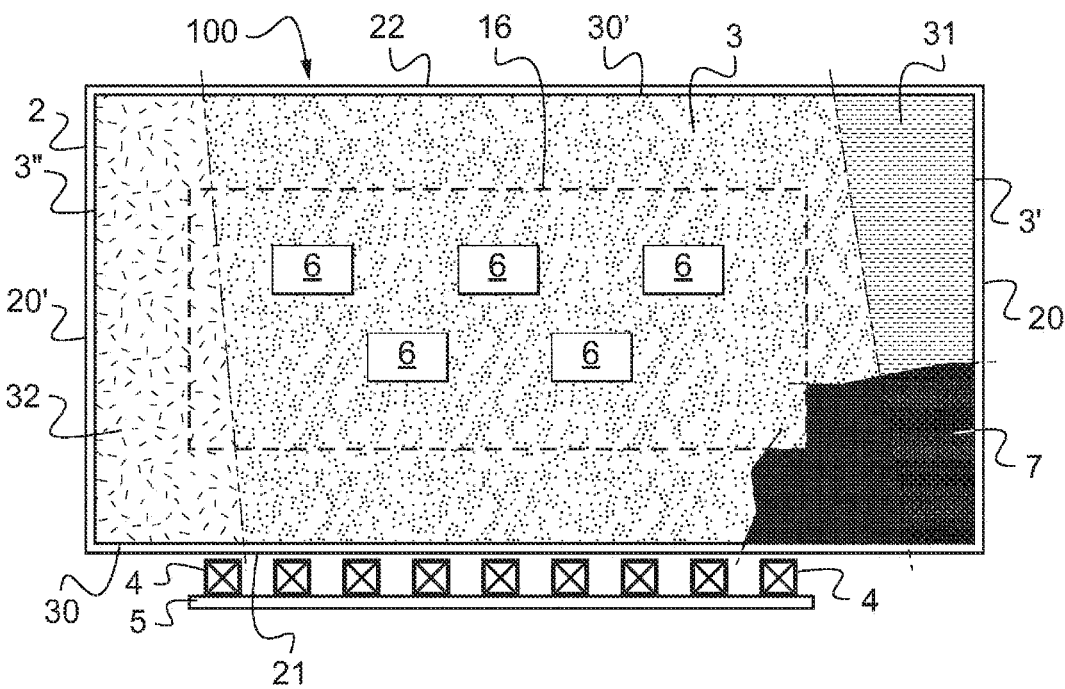

FIG. 1 shows a schematic cross-sectional view of a light-emitting laminated motor vehicle glazing 100 according to the invention in a first embodiment (with peripheral light injection). FIG. 1' shows a schematic front view of the glazing 100 of FIG. 1.

Here it involves a laminated glazing 100 which here is a car roof, rectangular and bent, which comprises:

a first glass sheet 1, herein forming an external sheet, for example rectangular (with dimensions of 300×300 mm, for example), with a composition for a tinted solar control function (glass FROM VG10 or TSA 4+ sold by Saint-Gobain Glass), for example with a thickness equal to 2.1 mm, or is a clear glass, with a first main face 11 here corresponding to face F1, a second main face 12 on the interior side here corresponding to F2, coated with an athermal coating (if clear glass) 16' or else heating, etc., and an edge surface (longitudinal edge faces 10 and 10'), with refractive index nv for example of at least 1.5 in the visible range a multi-layer (multi-sheet), polymeric (transparent) lamination interlayer 3, in particular a multi-layer adhesive interlayer (e.g. 2 layers here), a second glass sheet 2, here of the same dimensions as the glass pane 1, forming internal glazing, on the passenger compartment side, here made from mineral glass, having a third main face 11 corresponding to face F3 and a fourth main face 12 which herein is face F4, and an edge surface (longitudinal edge faces 21 and 22)—of thickness equal for example to 2.1 mm or even thinner, of refractive index n'v for example of at least 1.5 in the visible range The second face 12 comprises an internal masking layer 7 forming a masking frame for example a black enamel (deposited on the second face 12), delimiting a clear glass area 16 (daylight), in this case rectangular (see FIG. 1'). A peripheral opaque interior masking layer 7' may be desired on the fourth main face 14, notably congruent with or narrower than the width of the internal masking layer 7 and adjacent to the optional athermal layer 15.

The second glass sheet 2 is preferably a soda-lime-silica glass, in particular colorless, even clear or extra-clear, such as the Diamond glass marketed by Saint-Gobain Glass, n'v being about 1.52 to 550 nm, or 1.95 mm Optiwhite glass.

The second glass sheet 2 may comprise an athermal ITO stack 15 on the fourth face 14, here F4.

The lamination interlayer comprises an upper part, here single-layer (or multi-layer, e.g. 1 or 2 or 3 adhesive layers and even adhesive films), and a lower part, here single-layer (or multi-layer, e.g. 1 or 2 or 3 adhesive layers and even adhesive films), in adhesive contact with the third face (bare or already coated).

It thus comprises:

a first upper layer 31 which is a polymer, thermoplastic (PVB, EVA, TPU) or crosslinked polymer (OCA type) adhesive layer, particularly in the form of a film or coating deposited on the second coated face, the first upper layer 31 (optionally tinted) having a refractive index n1 in the visible range, a first lower layer 32 which is a polymer, thermoplastic (PVB, EVA, TPU) or crosslinked polymer (OCA type) adhesive layer, in particular as a film or coating deposited on the third face, the first lower layer 32 (preferably clear) having a refractive index n'1 in the visible range.

The first upper layer 31 is at least 1 μm (in particular if OCA coating) or 30 μm (in particular if OCA film), in particular the first upper layer is preferably submillimeter.

The first lower layer 32 is at least 1 μm (in particular if OCA coating) or 30 μm (in particular if OCA film), in particular the first lower layer is preferably submillimeter.

The thickness of the first upper and/or lower layer can be adapted for mechanical contribution. For simplicity, these are layers 31, 32 of the same polymer and even the same thickness. The layer 31 can be tinted with an additional coloring agent.

The first upper layer 31 and/or upper layer 32 has edges that extend, for example, to the edges 10 to 22 of the glass panes 1, 2. For example, the lamination interlayer and even the laminated glazing have a haze of at most 1%.

Between (and in contact with) the first upper layer 31 and/or upper layer 32, there is an intermediate layer 3, with first and second edge faces 30, 30', here longitudinal, possibly offset from the longitudinal edge faces 10, 10' toward the center of the glass pane (thus recessed). The intermediate layer 3 has a thickness E0 of n0 more than 2 mm or even 1 mm and at least 200 μm with a refractive index n0 in the visible range, where $n0-n1$ is at least 0.04 in the visible range or even at least 0.1 or at least 0.15 or 0.2 or 0.25 and in particular $n1<nv$, and $n0-n'1$ which is at least 0.04 or even at least 0.1 or at least 0.15 or 0.2 or 0.25 and in particular $n'1<n'1$.

This layer 3 is a thermoplastic film (polyester, PET, PC, etc.) or glass film (UTG, etc.) or a thermoplastic adhesive film (PVB, etc.), forming a (central) part of the lamination interlayer.

n1, n'1 is chosen based on n0 or vice versa. For example, if n1 is at most 1.43, n0 will be chosen to be at least 1.47; if n1 is at most 1.4, n0 will be chosen to be at least 1.44.

To form the first lower and/or upper layer in the form of an OCA coating 31, 32, the following resins can be cited as low refractive index (photo-)crosslinkable liquid adhesives:

based on urethane acrylate, for example from Norland, in particular the product called LOCA Norland NOA 1315 (refractive index 1.315), which is an aliphatic urethane acrylate, based on fluoro urethane acrylate, for example from Shin-A, in particular the product called SFA 335 (refractive index 1.335-1.339) or SFA 387 (refractive index 1.385-1.389), based on acrylate, for example, in particular the product called UZ181A (refractive index 1.47) from AKChemTeck, or else the product called UVEKOL S15 (refractive index 1.44) from Allnex.

As an acrylate-based PSA film, mention may be made of the product CS986 (refractive index 1.47) from Nitto.

As silicone-based PSA film, mention may be made of the product called Opt Alpha Gel from Taica (refractive index 1.41).

Two OCA layers can be configured on either side of the layer 3 (particularly non-adhesive film 3 (polyester, PET, PC), in particular all acrylate-based, preferably to avoid chemical contamination:

coating 31/film 3, in particular non-adhesive/coating 32

OCA film 31/film 3, in particular non-adhesive/OCA coating 32

OCA coating 31/film 3, in particular non-adhesive/OCA film 32

OCA film 31/film 3, in particular non-adhesive/OCA film 32

OCA film 31/film 3, in particular non-adhesive/OCA film 32.

Alternative configurations include:

OCA coating 31/film 3, in particular non-adhesive/PVB or EVA 32

PVB film 31/film 3, in particular non-adhesive/OCA coating 32

PVB film 31/film 3, in particular non-adhesive/PVB film 32

PVB or EVA film 31/film 3, in particular non-adhesive/ EVA film 32.

Since EVA has a lower refractive index than TPU, it can be preferred to laminate glass, especially organic glass.

The OCA film may be a self-supporting crosslinked polymer film selected from:

pressure-sensitive film, preferably with acrylate, or a partially photo-crosslinked polymer post-adhesive film before assembly and photo-crosslinked, and preferably with acrylate, With a post-adhesive film, adhesive contact results from further photo-crosslinking. Before carrying out the cross-linking, the assembled glazing is placed under vacuum for degassing, then placed in a pressurized autoclave with a positive pressure of 2-4 bar, for example, and optionally, at a temperature greater than ambient temperature.

In particular, the pressure sensitive adhesive (PSA) bonds by contact after application of a mechanical pressure.

This OCA film (PSA or post-adhesive) 31 and/or 32 can be locally textured for extraction (extractor film) as described later.

In addition, if necessary, a so-called framing layer of PVB (not shown) can surround the perimeter of the edge face of the intermediate layer.

One or both of the first lower and upper layers 31 and 32 may be PVB layers projecting beyond the edges 30', 30 of layer 3 and even without any discernible interface with the framing layer between these projecting edges of the layers 31 and 32.

The glazing is simple in design, particularly if OCA layers 31, 32 are used, and by choosing a single lower interlayer 32 and upper interlayer 31 there is less risk of chemical incompatibility between different interlayer or non-adhesive polymer materials.

A light source 4 is in optical coupling with the intermediate layer forming the light guide. The light beam (after refraction on the coupling edge face 30) propagates by total internal reflection in the light guide intermediate layer due to the choice of n0, n1 and n'1.

Light-emitting diodes 4 extend along the longitudinal coupling edge 30 of the intermediate layer 3. Light is injected peripherally and through the edge face of the intermediate layer 3. These are front-emitting diodes. Thus, these diodes 4 are aligned on a PCB support 5, for example a parallelepiped strip. The PCB support 5 is spaced or in contact with the edge 30 of the intermediate layer 3 and/or attached, for example by glue (or double-sided adhesive), to the glazing via the edge face 10 or 21 or to the edge 21 and/or even to the face F4.

Light from the light source here is injected into the intermediate layer 3 via an edge face of the intermediate layer 3, or alternatively via a wall of a closed hole in the intermediate layer 3. The edge face 30 can be notched.

The edges 310 and 320 of the layers 31 and 32 may or may not be aligned with the coupling edge 30 (e.g. projecting beyond it)

Alternatively, the light source may be one or more primary sources (diodes, etc.) coupled directly to a guide, along the coupling edge face 30, for example extracting optical fibers with light output zone (texturing of the optical fiber, etc.).

The light-emitting glazing 100 may have a plurality of extraction zones 6 for the guided light, in particular of given geometry (rectangular, square, round, etc.).

The light extraction means are for example:

texturing of a so-called textured element chosen from the intermediate layer, or at least one of the first upper and lower layers 31, 32, or an extractor film inserted between one of the first upper and lower layers 31, 32, and the intermediate layer 3 or a scattering layer comprising a binder and scattering particles and/or pores, inserted between one of the first upper or lower layers 31, 32 and the intermediate layer.

For example, for the light extraction means, this is a scattering layer 6 (screen-printed, e.g. enamel on glass 3 or ink on PET 3) on the second face and/or third face side. The layer 6 is in the clear glass area 16 herein. Alternatively, it may be a local extractor film placed or bonded locally on the layer 3 (with reliefs or with scattering layer or scattering in the bulk).

The extraction means are in the clear glass area 16 but could be peripheral, under the internal masking layer 7 and visible from the passenger compartment with a gap of an optional interior masking layer 7' on the fourth face.

For example, the distance between the extraction 6 and the diodes 4 is at least 10 or 40 mm. For example, the extraction 6 occupies from 10 to 100% of the clear glass area 16. As shown in FIG. 1', a set of disjointed scattering patterns 6, for example rectangular in shape, can be used.

It is possible to provide several series of diodes 4 (one edge, two edges, three edges, over the entire periphery, controlled independently and even of different colors. White or colored light-emitting diodes can be selected for ambient lighting, reading, etc. A red light can be selected for signaling, possibly alternating with green light. The diode support 5 may be adhesively bonded to the edge face 30.

Furthermore, if necessary for protection purposes, a so-called framing layer (not shown) can surround the perimeter of the edge face of the intermediate layer 3, preferably a thermoplastic adhesive or crosslinked polymer layer in contact with the intermediate layer 3 and in adhesive contact with the third face and with the second face, in particular framing layer offset from the clear glass area. If this is the case, it may be preferable to limit losses by injecting directly through the coupling edge face, without refraction in the framing layer. To achieve this, the framing layer 3 may be locally absent (hollowed out) in the coupling zone. Preferably, the emitting face of the diodes and the coupling edge face 30 is at most 5 cm or even 5 mm or even in adhesive or non-adhesive contact.

Alternatively, the light source can be an assembly comprising a primary diode and an optical guide or fiber with extracting zone(s) opposite the coupling edge 30.

Preferably, the second sheet 2 and/or any other layer is colorless on the side of the extracted light observer (inside the passenger compartment here, or outside the vehicle).

The thickness between first face and fourth face is preferably at most 9 mm or 7 mm, in particular for this road vehicle.

The front and rear side edges 3', 3" of the intermediate layer 3 can be set back from the front 20 and rear 20' side edges of the first or second glass sheet.

The longitudinal edges 30, 30' of the intermediate layer 3 can be set back from the longitudinal edges 10, 21, 10', 22 of the first or second glass sheets.

Preferably, the intermediate layer 3 occupies at least 90% of the main glazing surface.

Alternatively to the glass for the second sheet, use may be made of an organic glass, for example a PC, and preferably the first glass sheet is then tempered.

The roof 100 can form, for example, a fixed luminous panoramic roof for a motor vehicle such as a car, which is mounted on a bodywork from the outside via an adhesive.

This laminated light-emitting glazing 100 can alternatively form a windscreen with internal light signals (pictograms, etc.), particularly for driving assistance. The scattering layer 6 (or other extraction means) for example forms an anti-collision signal along the lower longitudinal edge in particular. For example, the light turns on (red) when a vehicle in front is too close.

This laminated light-emitting glazing 100 can alternatively form a front or rear quarter panel, or a front windscreen with luminous decoration or external lighted signage. The scattering layer 6 forms for example a turn signal indicator or a LOGO. In these latter cases, the second sheet of colorless glass (preferably mineral) is the exterior glazing (fourth face is face F1, third face is face F2) and the first sheet of glass is the interior glazing (tinted or colorless) with the first face being face F4, and the second face being face F3.

Figure 2:
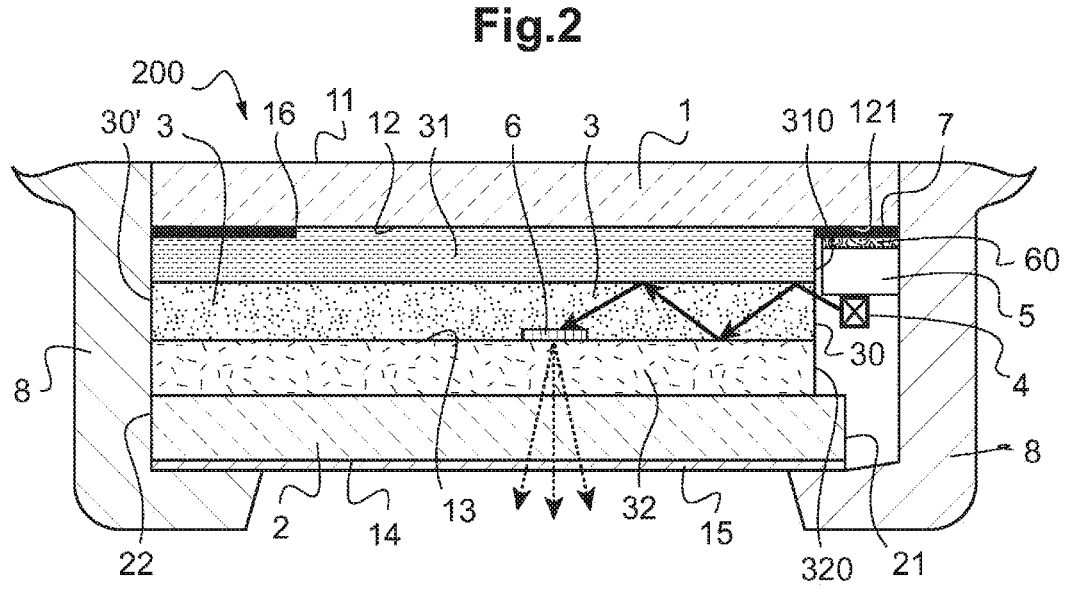

FIG. 2 shows a schematic cross sectional view of a laminated light-emitting glazing 200 for a motor vehicle in a second embodiment (by injection of peripheral light, here via an edge face). FIG. 2' shows a schematic cross sectional view of a laminated light-emitting glazing 200 for a motor vehicle which is a roof mounted in a vehicle.

This glazing 200 differs from the glazing 100 in that:
the diodes 4 are side-emitting diodes under a peripheral part 121 of the second face 12 and masked from the outside by the internal masking layer 7, and even glued to the part 121 by an adhesive 60 (double-sided tape, etc.)
the second glass sheet 2 is optionally smaller than the first sheet (edge 21 set back from the edge 10)
it is encapsulated by a polymer encapsulation 8, in particular flush with the first sheet 1, which can be perforated (hole toward the passenger compartment, etc.) to remove the light source 4.

The roof can for example form a fixed luminous panoramic roof 200 of a motor vehicle, such as a car, mounted externally on the bodywork 8' via an adhesive 61' as shown in FIG. 2'.

Figure 3:
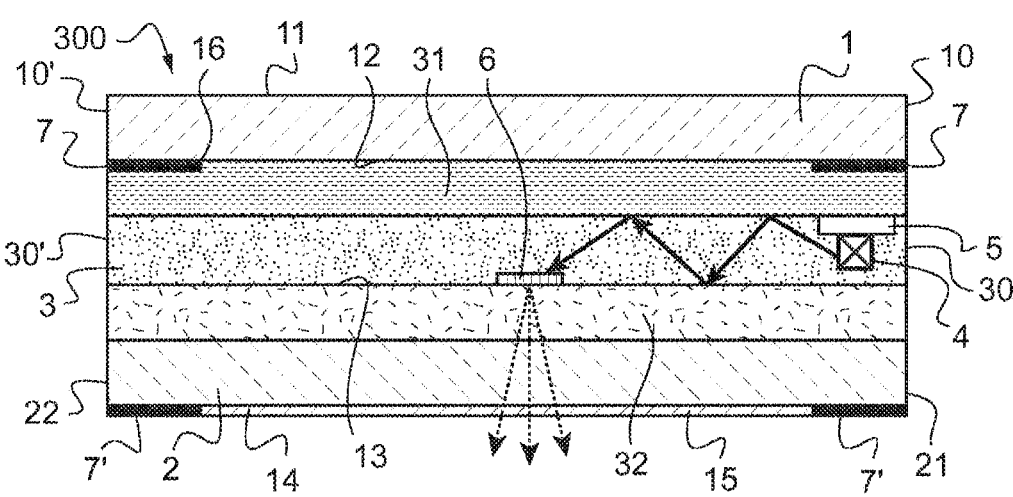
Figure 3:
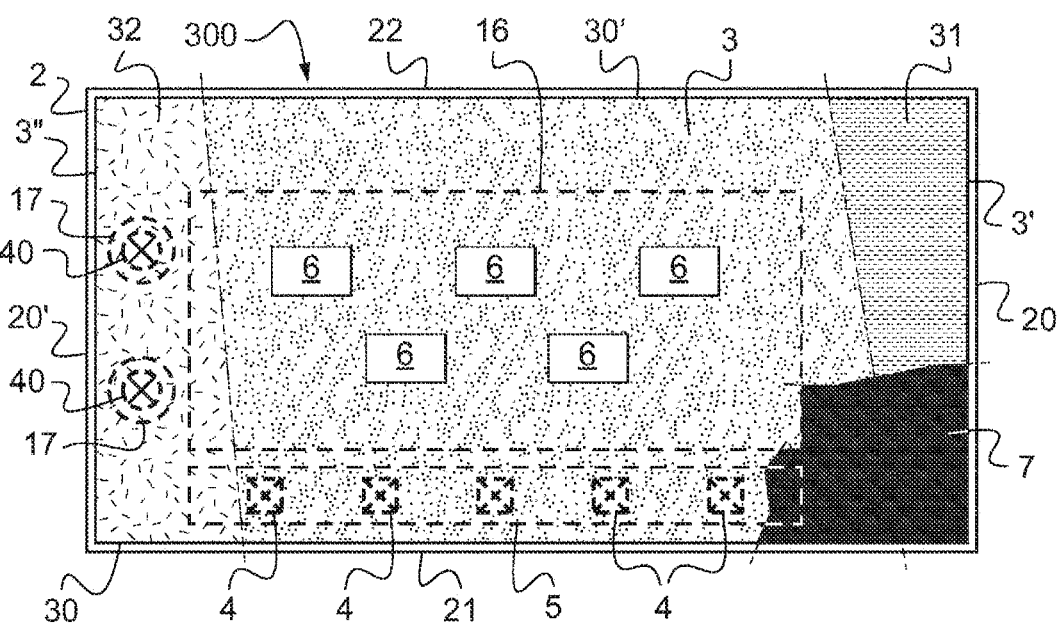

FIG. 3 shows a schematic cross-sectional view of a laminated light-emitting glazing 300 for a motor vehicle in a third embodiment (with peripheral light injection). FIG. 3' shows a schematic front view of the glazing of FIG. 3.

This glazing 300 (in particular a roof) differs from the glazing 100 in that the light source (side-emitting diodes 4 here and PCB support 5) is inserted between the second face 12 and the third face 13, for example in a cavity of the intermediate layer 3. The rear face of the support 5 can be glued in adhesive contact with the first upper adhesive layer 31.

Alternatively (or cumulatively) to a linear light source of the diode array 4 type, more local light sources can be installed in peripheral holes 17 of the intermediate layer 3, for example along the rear (or front) lateral edge 20' of the glazing.

The diode support 5 can project from the glass edge face 10 and/or 21, keeping the diodes in contact with the guide 3.

Alternatively, the coupling edge 30 is recessed sufficiently to accommodate all or part of the light source (diodes and diode support).

There may also be extraction means between the layer 3 and the second face, extracting light for the interior or exterior (depending on the glazing).

The extraction means 6 or 6' are in the clear glass area, but could be peripheral, below the internal masking layer in a zone with n0 interior masking layer 7'.

Figure 4:
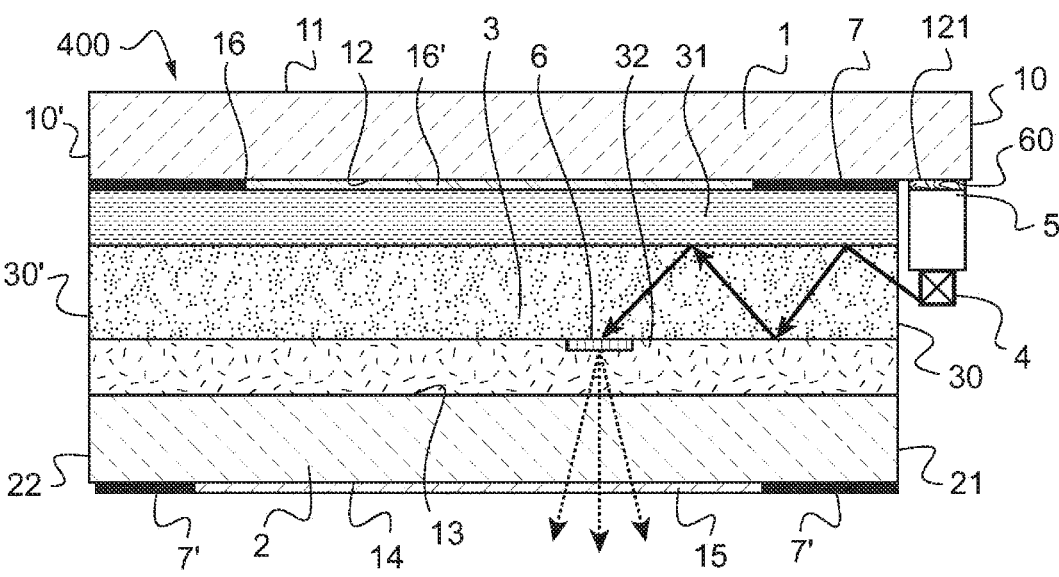
FIG. 4 shows a schematic cross-sectional view of a light-emitting laminated glazing for a motor vehicle in a fourth embodiment.

FIG. 4 shows a schematic cross-sectional view of a laminated light-emitting glazing 400 for a motor vehicle in a fourth embodiment (with peripheral light injection).

This glazing 400 (for example a roof) differs from the glazing 100 in that:
the diodes 4 are side-emitting diodes under a peripheral part 121 of the second face 12 and masked from the outside by the internal masking layer 7, and even glued to the part 121 by an adhesive 60 (double-sided tape, etc.)
For example, the second glass sheet 2 is optionally smaller than the first sheet 1 (edge 21 set back from the edge 10).

FIG. 5 shows a schematic cross-sectional view of a laminated light-emitting glazing 500 for a motor vehicle in a fifth embodiment (with peripheral light injection). FIG. 5' shows a schematic front view of the glazing of FIG. 5.

This glazing 500 (e.g. a roof) differs from the glazing 100 in that the coupling edge 30 is set back sufficiently to place all or part of the light source (diodes 4 and diode support 5) between the second and third faces 12, 13.

Additionally, for protective and/or retaining purposes, a so-called framing layer 9 surrounds the perimeter of the edge face of the guide layer 3 and is in adhesive contact with the layer 3 and in adhesive contact with the first lower and upper layers 31, 32 projecting from the edge 30, or alternatively with the third and second faces.

The framing layer 90 is made of PVB, for example.

The internal edge of the framing layer 90 is offset from the clear glass area, below the internal masking layer 7.

Additionally, the light source (diodes 4 and diode support 5 are housed in a U-shaped (or L-shaped) section, with a base 80 and returns 81, 82 clamped or glued to the first lower and upper layers 31, 32 projecting from the edge 30 or alternatively to the third and second faces. Here, the profiled module and light source 4 is bonded to the framing layer 90, so that between the coupling edge 30 and the diodes there is a zone with the framing layer 90.

It may be preferable to limit losses by injecting light directly through the coupling edge face, without refraction in the framing layer 90. To achieve this, the framing layer 90 may be locally hollowed out in the coupling zone.

FIG. 6 shows a schematic cross-sectional view of a laminated light-emitting glazing 600 for a motor vehicle in a sixth embodiment (with peripheral light injection via the coupling edge face 30).

This glazing (for example a roof) 600 differs from the glazing 100 primarily in that:
the coupling edge 30 is set back, leaving a groove 41 between the layers 31 and 32, the diodes 4 and the support 5 housed in a section with a base 80, and a return 81 in the groove 41
in the upper part of the interlayer, an additional (first and here only) upper adhesive layer 33 is added between the second face and the first upper adhesive layer 31 (preferably OCA), e.g. for mechanical reinforcement, in particular layer 33 which is a thermoplastic film of PVB e.g. of 0.38 or 0.76 mm or of TPU or EVA (thermoplastic or thermoset).

Cumulatively or alternatively, an additional (first) lower adhesive layer can be added between the first lower polymer layer 32 (adhesive, OCA or thermoplastic) and the third face 13, for example for mechanical reinforcement. In particular, the (first) additional lower adhesive layer is a thermoplastic film of PVB, e.g. 0.38 or 0.76 mm, or of TPU or EVA (thermoplastic or thermoset). In particular, EVA is chosen if the second sheet is an organic glass.

FIG. 7 shows a schematic cross-sectional view of a light-emitting laminated glazing 700 for a motor vehicle in a seventh embodiment. FIG. 7' shows a schematic front view of the glazing 700.

This glazing (e.g. a roof) 700 differs mainly from the previous glazing 600 in that the diodes are embedded in the intermediate layer 3 or in a cavity of the coupling edge 30. Another light source 4' has been added on another PCB support 5' (here in two disjointed or possibly connected pieces), on an edge along the longitudinal edge 22 opposite the first edge 21. For example, colors or on/off triggers can be varied.

If the internal masking layer 7 is not opaque enough to mask the diodes 4, an opaque element can be added between the diodes and the internal masking layer 7.

The diode support 5 (or 5') can project from the glass edge face 10 and/or 21, keeping the diodes in contact with the guide 3.

Alternatively (or cumulatively) to a linear light source of the diode array 4 type, more local light sources can be installed in peripheral holes 17 of the intermediate layer 3, for example along the front lateral edge 20 of the glazing.

FIG. 8 shows a schematic cross-sectional view of a light-emitting laminated glazing 800 for a motor vehicle in an eighth embodiment. FIG. 8' shows a schematic front view of roof of the glazing 800.

This glazing (e.g. a roof) 800 differs mainly from the glazing 100 in that the coupling edge 30 is set back, leaving a groove 41, and the side-emitting diodes 4 and the support 5 are located in the groove 41. The edge 320 of the first lower layer 32 is set back here, for example comprising a notch, to insert the diode support.

FIG. 9 shows a schematic cross-sectional view of a light-emitting laminated glazing 900 for a motor vehicle in a ninth embodiment.

This embodiment (e.g. a roof) 900 thus differs from the glazing 100 by the injection of light and the location of the light source 4.

Diodes 4 (here front-emitting diodes) on a diode support 5 face (or are offset from) the fourth main face 14, and optical coupling with the intermediate layer 3 (preferably thermoplastic film, e.g. polyester, PET, PC or ultra-fine glass) takes place via a local light redirecting element for guidance, such as an optical redirecting film 9, facing the internal masking layer 7 between the guide layer 3 and the first upper layer 31, preferably adhesive and even OCA.

For example, this is a prismatic polymer film 9 (polyester, in particular PET, PC) preferably with reflective prisms 91 and a flat part 92 (surface opposite the textured surface), for example a film with a thickness of 100 to 300 μm, preferably at most 150 μm. The prismatic film 9 forms a longitudinal strip, like the linear diode light source 4, along a longitudinal edge 21 of the roof for example.

This prismatic film 9 comprises, for example, prisms formed by texturing the polymer or, alternatively, by texturing a layer (resin, etc.) on a flat polymer film, the prisms being coated with a reflective conformal layer (metallic, etc.). The prismatic film 9 is applied or bonded to guide layer 3, with prisms oriented toward the second face 12 and, for example, prisms filled with OCA adhesive 31 (LOCA or film).

It is a flexible film, and therefore curved, so it adapts to the curvature of the glazing.

This prismatic film 9 and/or the light source 4 is for example at most 100 mm from the clear glass area and/or preferably at least 10 or 20 mm.

Alternatively, the prisms 91 are oriented toward the third face 13 instead of the second face 12.

Alternatively, the first upper layer 31 is set back (not covering the prismatic film 9) and even the prisms are spaced apart or against or bonded to the masking layer 7.

Alternatively, the prismatic film 9 is transparent, between the first lower layer 32 and the intermediate layer 3, prisms oriented toward the face F3 (flat face in contact with the intermediate layer 3) or prisms oriented toward the face F2 in contact with the intermediate layer 3 (flat face in contact with the first lower layer 32).

FIG. 10 shows a schematic cross-sectional view of a light-emitting laminated glazing 1000 for a motor vehicle in a tenth embodiment.

This glazing (e.g. a roof) 1000 thus differs from the glazing 900 mainly in that in the event that the internal masking layer 7 is not sufficiently opaque to mask the diodes 4, an opaque element 83 is added between the prismatic film 9 and the internal masking layer 7.

If present, the ITO-based layer 15 has, for example, a spacing 15' in line with the light source 4.

Alternatively, the prismatic film 9 is transparent, between the first lower layer 32 and the intermediate layer 3, prisms oriented toward the face F3 (flat face in contact with the intermediate layer 3) or prisms oriented toward the face F2 in contact with the intermediate layer 3 (flat face in contact with the first lower layer 32).

FIG. 11 shows a schematic cross-sectional view of a light-emitting laminated glazing for a motor vehicle in an eleventh embodiment.

This glazing (e.g. a roof) 1100 thus differs from the preceding glazing 1000 in that in the upper part of the interlayer, an additional (first and here only) upper adhesive layer 33 is added between the second face 12 and the first upper adhesive layer 31 (preferably OCA), e.g. for mechanical reinforcement, in particular additional upper adhesive layer 33 which is a thermoplastic film of PVB e.g. of 0.38 or 0.76 mm or of TPU or EVA (thermoplastic or thermoset).

Cumulatively or alternatively, an additional (first) lower adhesive layer can be added between the first lower polymer layer 32 (adhesive, OCA or thermoplastic) and the third face 13, for example for mechanical reinforcement. In particular, the (first) additional lower adhesive layer is a thermoplastic adhesive film of PVB, e.g. 0.38 or 0.76 mm, or of TPU or EVA (thermoplastic or thermoset). In particular, EVA is chosen if the second sheet 2 is an organic glass.

Alternatively, the prismatic film 9 is transparent, between the first lower layer 32 and the intermediate layer 3, prisms oriented toward the face F3 (flat face in contact with the intermediate layer 3) or prisms oriented toward the face F2 in contact with the intermediate layer 3 (flat face in contact with the first lower layer 32).

FIG. 12 shows a schematic cross-sectional view of a light-emitting laminated glazing 1200 for a motor vehicle in a twelfth embodiment This glazing 1200 differs mainly from the previous glazings in that a first (and only) additional lower polymer adhesive layer 34 is added between the lower polymer layer 32 and the third face 13. For example, the lower additional adhesive layer 34 provides a mechanical reinforcement, in particular a PVB film, e.g. 0.38 or 0.76 mm or EVA or TPU.

The lower layer 32 can be OCA adhesive or thermoplastic.

For example, the following stack is present between the faces 12 and 13:

PVB 33/thermoplastic film (athermal, etc.) or OCA film (PSA film, etc.) 31/film 3/thermoplastic film 3 or OCA film 32/PVB 34

PVB or EVA or TPU 33/thermoplastic film or OCA film (PSA film, etc.) 31/LOCA film or coating 3/thermoplastic film or OCA film 32/EVA or TPU 34 (if organic sheet 2).

FIG. 13 shows a schematic cross-sectional view of a light-emitting laminated glazing for a motor vehicle in a thirteenth embodiment This glazing 1300 differs from the previous glazing in that between the upper layer 31 and the second face 12 are added, in this order:

a first additional upper polymer layer 33, which is adhesive, OCA (especially film) or thermoplastic, or a thermoplastic film (non-adhesive) such as PET or glass (non-adhesive LOCA or athermal support film, tinted, barrier film between OCA and adhesive thermoplastic, etc.), in particular tinted, a second, additional upper polymer adhesive layer 35, OCA or thermoplastic (PVB etc.), in particular tinted.

For example, the following sequence of layers is present: PVB 35/thermoplastic film (barrier or athermal or LOCA support, etc.) tq PET 33/OCA film or coating (optionally tinted) 31.

And the following are added between the lower layer 32 and the third face in this order:

a first additional lower polymer layer 34 (adhesive, OCA or thermoplastic, or a thermoplastic (non-adhesive) film)

a second additional lower polymer adhesive layer 36.

For example, the following sequence is present: OCA coating or film (optionally tinted) 32/thermoplastic film (LOCA barrier or support, etc.) tq PET 34/PVB 36.

It is possible to have an asymmetrical structure with three layers 31, 33, 35 and two layers 32, 34, or the reverse: three layers 32, 34, 36 and two layers 31, 33.

In all of the embodiments shown:

at least one of the layers 31, 33, 35 can be tinted and/or the first sheet 1 can be tinted and/or colorless with an athermal coating (silver stack, etc.).

When the diode support (diode array) 5 is between the second and third faces, it can be clamped and/or wedged by means of spacers between the second face 12 and the support 5 or a section housing the support and/or between the third face 13 and the support 5 or a section housing the support.

The second glass sheet (interior) can be made of organic glass, e.g. PC, PMMA.

The invention claimed is:

1. A light-emitting glazing for a vehicle, comprising a laminated glazing, comprising:

a first sheet, made of mineral or organic glass, with a first main face and a second main face, a second sheet, made of mineral or organic glass, with a third main face and a fourth main face, a polymer lamination interlayer, a first upper layer with a refractive index n1 in the visible range, a first lower layer with a refractive index n'1 in the visible range, between the first lower and upper layers, and in contact with, an intermediate layer with a refractive index no in the visible range, with n0–n1 which is at least 0.04 in the visible range, and n0–n'1 which is at least 0.04 in the visible range, the first upper layer being between the second main face and the intermediate layer, the first lower layer being between the intermediate layer and the third main face, a light source in optical coupling with the intermediate layer forming a light guide, light extraction means, to extract light guided in the intermediate layer, wherein the intermediate layer is a thermoplastic or glass film or a thermoplastic adhesive film, forming part of the lamination interlayer, the intermediate layer having a thickness of at most 2 mm and at least 200 μm, and wherein at least one of the first lower and upper layers is adhesive and made of crosslinked polymer material, forming part of the lamination interlayer.

2. The light-emitting glazing for a vehicle according to claim 1, wherein the intermediate layer is a thermoplastic or glass film.

3. The light-emitting glazing for a vehicle according to claim 1, wherein the other of the first lower or upper layers is adhesive forming part of the lamination interlayer.

4. The light-emitting glazing for a vehicle according to claim 1, wherein the first lower and upper adhesive layers are crosslinked polymer layers, n1 and n'1 is at most 1.48.

5. The light-emitting glazing for a vehicle according to claim 1, wherein the first upper and/or lower layer is a crosslinked polymer adhesive layer, the crosslinked polymer material is chosen from polymers based on polyacrylate.

6. The light-emitting glazing for a vehicle according to claim 1, wherein the first lower and/or upper adhesive layer is a self-supporting crosslinked polymer film chosen from:

pressure-sensitive film, the crosslinked polymer material further having a polymer, or a post-adhesive polymer film partially photo-crosslinked before assembly, and photo-crosslinked, the crosslinked polymer material further having a polymer.

7. The light-emitting glazing for a vehicle according to claim 1, wherein the first lower adhesive layer and/or the first upper adhesive layer is a crosslinked polymer adhesive coating which is on the intermediate layer.

8. The light-emitting glazing for a vehicle according to claim 1, comprising, between the second main face and the first upper layer, an additional upper adhesive layer which is a thermoplastic adhesive film, which is bare or coated with a functional coating.

9. The light-emitting glazing for a vehicle according to claim 1, comprising, between the second main face and the third main face, the following stack:

(first PVB or EVA sheet)/first crosslinked polymer adhesive upper layer/intermediate layer which is a thermoplastic or glass film/first crosslinked polymer adhesive lower layer/(PVB or EVA or TPU), (first PVB or EVA sheet)/first crosslinked polymer adhesive upper layer/intermediate layer which is a thermoplastic or glass film/first adhesive lower layer/(PVB or EVA or TPU), (first PVB or EVA sheet)/first crosslinked polymer adhesive upper layer/intermediate layer which is a thermoplastic or glass film/first lower layer/(PVB or EVA or TPU), (first PVB or EVA sheet)/first adhesive upper layer/intermediate layer which is a thermoplastic or glass film/ first crosslinked polymer adhesive lower layer/(second PVB or EVA or TPU sheet), or (first PVB or EVA film)/first upper layer/intermediate layer which is a thermoplastic or glass film/first crosslinked polymer adhesive lower layer/(second PVB or EVA or TPU sheet).

10. The light-emitting glazing for a vehicle according to claim 1, wherein between the intermediate layer and the third main face, the glazing is free from thermoplastic adhesive layer and/or between the intermediate layer and the second main face, the glazing is free from thermoplastic adhesive layer.

11. The light-emitting glazing for a vehicle according to claim 1, wherein the first sheet is tinted and/or the first upper layer is tinted and/or an additional upper adhesive layer is tinted.

12. The light-emitting glazing for a vehicle according to claim 1, wherein the first upper layer is adhesive and made from a crosslinked polymer material and the first lower layer is a thermoplastic polymer film of submillimeter thickness or a coating, the first lower layer is in contact with the intermediate layer which is said thermoplastic adhesive film and with an additional adhesive lower adhesive, crosslinked polymer or thermoplastic layer, on the third main face or wherein the first lower layer is adhesive and made from a crosslinked polymer material and the first upper layer is a thermoplastic polymer film of submillimeter thickness or a coating, the first upper layer is in contact with the intermediate layer which is said thermoplastic adhesive film and with an additional adhesive upper adhesive, crosslinked polymer or thermoplastic layer, on the second main face.

13. The light-emitting glazing for a vehicle according to claim 12, wherein the first upper layer is an optionally fluoropolymeric thermoplastic film, at least 30 μm thick and submillimeter, bonded to the second main face by at least one additional upper adhesive layer of crosslinked polymer or thermoplastic material or two upper adhesive layers, a first of crosslinked polymer material and a second of thermoplastic polymer material bonded to the second main face.

14. The light-emitting glazing for a vehicle according to claim 1, wherein at least one optical film is between the intermediate layer and one of the first upper or lower layers, and wherein the optical film is chosen from:

extractor film, forming a means of extracting guided light and/or a local redirecting film, forming means for redirecting light into the intermediate layer from a light source on the fourth or offset face of the glazing.

15. The light-emitting glazing for a vehicle according to claim 1, wherein the light extraction means comprise:

texturing a textured element chosen from the intermediate layer, or at least one of the first upper or lower layers, or an extractor film inserted between at least one of the first upper and lower layers, or a scattering layer comprising a binder and scattering particles and/or pores, inserted between at least one of the first upper and lower layers and the intermediate layer, a local scattering zone of the intermediate layer comprising scattering particles and/or pores.

16. The light-emitting glazing for a vehicle according to claim 1, wherein light from the light source is injected into the intermediate layer:

1) Through an edge face of the intermediate layer or a wall delimiting a closed hole in the intermediate layer, 2) Or by a local light-redirecting element, the light source then being opposite or offset from the fourth main face.

17. The light-emitting glazing for a vehicle according to claim 1, wherein the light source comprises a set of diodes on a diode support.

18. The light-emitting glazing for a vehicle according to claim 1, wherein a framing layer surrounds the perimeter of the edge face of the intermediate layer and/or of the first lower and upper layers.

19. The light-emitting glazing for a motor vehicle according to claim 1, comprising an internal, peripheral, opaque masking layer between the third main face and the second main face, and optionally covering the perimeter of the intermediate layer, and optionally comprising, a peripheral, opaque interior masking layer on the fourth main face.

20. The light-emitting glazing for a vehicle according to claim 1, wherein the first sheet is the external sheet, the glazing is chosen from a roof, a windscreen, a side window, or in that the first sheet is the internal sheet.

21. A vehicle incorporating at least one light-emitting glazing according to claim 1.

* * * * *